United States Patent
Hatfield et al.

(10) Patent No.: US 10,482,638 B2
(45) Date of Patent: Nov. 19, 2019

(54) COLLABORATIVE COMMENTING IN A DRAWING TOOL

(75) Inventors: L. Tucker Hatfield, Kirkland, WA (US); Andrew G. Carlson, Redmond, WA (US); David Charles Wadsworth, Redmond, WA (US); Brian T. Hill, Duvall, WA (US); Robert James Straavaldson, Port Orchard, WA (US); Han Ui Jung, Redmond, WA (US); Darren Muller, Kirkland, WA (US); Michael J. Smith, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 300 days.

(21) Appl. No.: 13/294,988

(22) Filed: Nov. 11, 2011

(65) Prior Publication Data
US 2013/0124967 A1 May 16, 2013

(51) Int. Cl.
*G06F 17/21* (2006.01)
*G06F 17/00* (2019.01)
*G06T 11/60* (2006.01)
*H04L 12/58* (2006.01)
*G06F 8/10* (2018.01)

(52) U.S. Cl.
CPC ............. *G06T 11/60* (2013.01); *G06F 8/10* (2013.01); *H04L 51/16* (2013.01)

(58) Field of Classification Search
CPC .... G06F 17/241; G06F 3/04883; G06F 17/24; G06F 17/30525; G06F 17/50
USPC ............................................... 715/232, 233
See application file for complete search history.

(56) References Cited

U.S. PATENT DOCUMENTS

| | | | |
|---|---|---|---|
| 4,974,194 A | 11/1990 | Barker et al. | |
| 6,628,285 B1 * | 9/2003 | Abeyta et al. | 345/441 |
| 7,640,506 B2 | 12/2009 | Pratley et al. | |
| 7,937,663 B2 | 5/2011 | Parker et al. | |
| 8,321,784 B1 * | 11/2012 | Ranganathan | G06F 17/241 715/255 |

(Continued)

FOREIGN PATENT DOCUMENTS

| | | |
|---|---|---|
| CN | 1577279 A | 2/2005 |
| KR | 10-2007-0043353 | 4/2007 |

OTHER PUBLICATIONS

UsingADOBE® Acrobat® X PRO, published Oct. 11, 2011, pp. 1-496.*

(Continued)

*Primary Examiner* — Stephen S Hong
*Assistant Examiner* — Ahamed I Nazar
(74) *Attorney, Agent, or Firm* — Merchant & Gould P.C.

(57) ABSTRACT

Methods and systems providing for collaborative commenting in a drawing tool are provided. One example method includes receiving a shape on a drawing canvas, and receiving a comment associated with the shape, the comment including a name of a commenting user. The method also includes receiving an indication of a movement of the shape from the first position to a second position, and, in response to the indication of the movement of the shape, automatically moving the comment closer to the second position of the shape. In some cases, the commenting user can be a user other than the user adding the shape to the document, and can be performed by a concurrent editor of the document.

23 Claims, 20 Drawing Sheets

(56) References Cited

U.S. PATENT DOCUMENTS

| | | | |
|---|---|---|---|
| 8,332,253 B1* | 12/2012 | Farmer | G06Q 10/0633 705/7.27 |
| 8,417,666 B2 | 4/2013 | Bailor et al. | |
| 8,825,758 B2 | 9/2014 | Bailor et al. | |
| 9,210,067 B1 | 12/2015 | Agarwal | |
| 2002/0178184 A1 | 11/2002 | Kuchinsky et al. | |
| 2003/0090530 A1 | 5/2003 | Ramani et al. | |
| 2003/0131326 A1* | 7/2003 | Pfeil | G06F 17/50 716/137 |
| 2003/0154243 A1 | 8/2003 | Crockett et al. | |
| 2003/0214528 A1* | 11/2003 | Pierce et al. | 345/723 |
| 2004/0122897 A1 | 6/2004 | Seelemann et al. | |
| 2004/0172425 A1 | 9/2004 | Edelstein et al. | |
| 2005/0091578 A1* | 4/2005 | Madan | G06F 17/241 715/201 |
| 2005/0138541 A1 | 6/2005 | Euchner et al. | |
| 2005/0144222 A1 | 6/2005 | Marshall | |
| 2006/0053380 A1 | 3/2006 | Spataro et al. | |
| 2006/0080598 A1* | 4/2006 | Bargeron | G06F 17/241 715/232 |
| 2006/0200755 A1 | 9/2006 | Melmon et al. | |
| 2007/0074122 A1* | 3/2007 | Nichols | G06F 9/541 715/751 |
| 2007/0136449 A1 | 6/2007 | Da Palma et al. | |
| 2007/0283321 A1 | 12/2007 | Hegde et al. | |
| 2008/0159286 A1 | 7/2008 | Moore et al. | |
| 2008/0177782 A1 | 7/2008 | Poston et al. | |
| 2008/0180460 A1* | 7/2008 | Ford | 345/661 |
| 2009/0006936 A1* | 1/2009 | Parker | G06F 17/24 715/200 |
| 2009/0006948 A1* | 1/2009 | Parker | G06F 3/0483 715/255 |
| 2009/0123076 A1 | 5/2009 | Wirth et al. | |
| 2009/0125518 A1* | 5/2009 | Bailor | G06F 17/24 |
| 2009/0157811 A1* | 6/2009 | Bailor | G06F 17/24 709/204 |
| 2009/0172041 A1 | 7/2009 | Clarke et al. | |
| 2009/0271696 A1 | 10/2009 | Bailor et al. | |
| 2009/0327294 A1 | 12/2009 | Bailor et al. | |
| 2010/0031135 A1 | 2/2010 | Naghshin et al. | |
| 2010/0088676 A1 | 4/2010 | Yuan et al. | |
| 2010/0306004 A1* | 12/2010 | Burtner | G06Q 10/10 705/301 |
| 2011/0010635 A1 | 1/2011 | Fox et al. | |
| 2011/0063328 A1* | 3/2011 | Herman | G06T 19/00 345/681 |
| 2011/0145692 A1* | 6/2011 | Noyes et al. | 715/230 |
| 2012/0192055 A1 | 7/2012 | Antebi et al. | |
| 2012/0192086 A1 | 7/2012 | Ghods et al. | |
| 2012/0233554 A1 | 9/2012 | Vagell et al. | |
| 2013/0013560 A1* | 1/2013 | Goldberg | G06F 16/178 707/634 |
| 2013/0091419 A1* | 4/2013 | Caliman et al. | 715/236 |
| 2013/0124956 A1 | 5/2013 | Hatsfield et al. | |
| 2014/0279846 A1 | 9/2014 | Srinivasan et al. | |
| 2014/0372855 A1 | 12/2014 | Myerscough et al. | |
| 2015/0347683 A1 | 12/2015 | Ansari et al. | |
| 2017/0161313 A1 | 6/2017 | Ritter | |
| 2017/0199788 A1 | 7/2017 | Piaseczny et al. | |

OTHER PUBLICATIONS

Co-Authoring in SharePoint 2010, published May 25, 2010, pp. 1-7, hereinafter as SharePoint.*

Milsark_SharePoint 2010 Document Co-Authoring with Microsoft Word_Jun. 14, 2010.*

Microsoft word: adding images and drawings, applied tips: Mar. 2007, pp. 1-3. (Year: 2007).*

Qian, Dongqiu and M. D. Gross. Collaborative Design with NetDraw. Published Date: Jun. 7-8, 1999. Computer Aided Architectural Design (CAAD) Futures '99. G. Augenbroe and Charles Eastman, eds. Kluwer. http://code.arc.cmu.edu/archive/dmgftp/public_html/publications/pdfs/caadfutures99-netdraw.pdf. 14 Pages.

Co-authoring (i.e. Simultaneous Editing) in Word 2010. By Word Team. Published Date: Sep. 9, 2009. http://blogs.office.com/b/microsoft-word/archive/2009/09/09/co-authoring-in-word-2010.aspx. 6 Pages.

Adler, Andy, John C. Nash and Sylvie Noël. Challenges in Collaborative Authoring Software. Retrieved Date: Jul. 22, 2011. http://citeseerx.ist.psu.edu/viewdoc/download?doi=10.1.1.90.2170&rep=rep1&type=pdf. 17 Pages.

Document Co-Authoring. Michael Sampson on Collaboration. Making Collaboration Work: Strategy, Governance, User Adoption. Published Date: Mar. 15, 2011.http://currents.michaelsampson.net/document-co-authoring/. 13 Pages.

Thomas, Pete. Drawing Diagrams in an Online Examination. Published Date: Apr. 23, 2004. 8th CAA Conference. http://citeseerx.ist.psu.edu/viewdoc/download;jsessionid=DE0FD307120A54815BCBB7283C33E4F4?doi=10.1.1102.4271&rep=rep1&type=pdf. 12 Pages.

Kurze, Martin. TDraw: A Computer-based Tactile Drawing Tool for Blind People. Retrieved Date: Jul. 21, 2011. ACM Conference on Assistive Technologies: Assets '96. pp. 131-138. http://citeseerx.ist.psu.edu/viewdoc/download;jsessionid=F43C2352173DF55627C768DDFC216C09?doi=10.1.1.36.9805&rep=rep1&type=pdf. 8 Pages.

Co-pending U.S. Appl. No. 13/294,943, filed Nov. 11, 2011.

International Search Report and Written Opinion for PCT/US2012/064011 dated Mar. 29, 2013

AutoCAD Mobile-App, CmapTools, May 2010, pp. 1-258.

Non-Final Office Action dated Dec. 23, 2013 in co-pending U.S. Appl. No. 13/294,943.

U.S. Final Office Action dated Sep. 24, 2014 in co-pending U.S. Appl. No. 13/294,943.

"First Office Action Issued in Chinese Patent Application No. 201210448739.X", dated Feb. 10, 2015, 14 Pages.

Citro et al., "Conflict Management for Real-Time Collaborative Editing in Mobile Replicated Architectures," published by Australian Computer Society in 2007, pp. 1-10.

Milsark, Andy, "SharePoint 2010 Document Co-Authoring with Microsoft Word," published Jun. 14, 2010, pp. 1-7.

U.S. Non-Final Office Action dated Dec. 3, 2015 in co-pending U.S. Appl. No. 13/294,943.

"Second Office Action Issued in Chinese Patent Application No. 201210448739.X", dated Sep. 29, 2015, 10 Pages.

TrainSignal, "SharePoint 2010 Co-Authoring Part 1 (Word 2010)," Youtube.com [online] pp. 1-11. Retrieved from the Internet: <URL: https://www.youtube.com/watch?v=ugeKMBWdh3U>, published on Feb. 11, 2013.

"Co-Authoring in SharePoint 2010", Retrieved From: <<https://www.youtube.com/watch?v=hgl4OIZTOzM>>, May 17, 2010, 7 Pages.

"Document Collaboration and Co-authoring", Retrieved From: <<https://support.office.com/en-us/article/Document-collaboration-and-co-authoring-ee1509b4-1f6e-401e-b04a-782d26f564a4?ui=en-US&rs=en-1N&ad=IN>>, Sep. 7, 2015, 6 Pages.

"Excel—Get An Email Notification When Sheet is Updated", Retrieved From: <<https://web.archive.org/web/20160302121622/https://ccm.net/faq/6278-generate-email-notifications-for-excel-sheet-updates>>, Sep. 2015, 4 Pages.

"Using Notifications", Retrieved From: <<https://web.archive.org/web/20160715055759/https://help.smartsheet.com/articles/542904-using-notifications>>, Sep. 7, 2015, 4 Pages.

"Notice of Allowance Issued in Chinese Application No. 201210448739.X", dated Feb. 26, 2016, 4 Pages.

Gomes, Nuno, "Feature Request: Automatic e-mail Notification of Updates in Folders or Documents for Google Drive", Retrieved From: <<https://productforums.google.com/forum/#!topic/drive/fsYwbZ3hpjc>>, Jun. 24, 2012, 6 Pages.

Ignat, et al., "Draw-together: Graphical Editor for Collaborative Drawing", In the Proceedings of the 20th Anniversary Conference on Computer Supported Cooperative Work, Nov. 4, 2006, pp. 269-278.

(56) References Cited

OTHER PUBLICATIONS

"Final Office Action Issued in U.S. Appl. No. 13/294,943", dated Jun. 27, 2019, 21 pages.

* cited by examiner

Mobile Computing Device

COLLABORATIVE COMMENTING IN A DRAWING TOOL

RELATED APPLICATIONS

This application is related to co-pending U.S. patent application Ser. No. 13/294,943, titled "Coauthoring in a Drawing Tool," filed on Nov. 11, 2011, which is hereby incorporated by reference in its entirety.

BACKGROUND

Computer-aided drawing tools are often used by design professionals to design a variety of systems, such as electrical diagrams, floor plans, business processes, program architectures, state machines, and other types of systems. Commenting in a drawing tool involves different considerations from those presented in other software in which commenting systems are provided, such as presentation software or word processing software. This is because, while in word processing or presentation software data is managed in a sequentially-organized document, in a drawing tool various features can be arranged in different orders within a particular page or set of pages.

Additionally, traditionally a smaller set of individuals has access to drawing tool software as compared to presentation or word processing software. While those individuals may not wish to purchase a full copy of drawing tool software, they may wish to be able to make comments on drawings that have been created by those who do have the drawing tool software. Currently, no mechanism exists for allowing such commenting to occur.

SUMMARY

In accordance with the following disclosure, the above and other problems are addressed by the following:

In one aspect, a computer-implemented method includes receiving a shape on a drawing canvas, and receiving a comment associated with the shape, the comment including a name of a commenting user. The method also includes receiving an indication of a movement of the shape from the first position to a second position, and, in response to the indication of the movement of the shape, automatically moving the comment closer to the second position of the shape.

In a second aspect, a computer-implemented method of managing comments in a drawing document is disclosed. The method includes receiving a shape on a drawing canvas, and receiving a first comment from a user, associated with the shape. The method also includes receiving a second comment from a user, the second comment associated with the drawing canvas. The method further includes displaying a first icon indicating the presence of the first comment alongside the shape, and displaying a second icon indicating the presence of the second comment on the drawing canvas.

In a third aspect, a system for facilitating collaborative commenting in a drawing tool is disclosed, and includes a drawing tool executable on the first client computing system, the drawing tool configured to access a drawing document stored at a server system and display the drawing document including a drawing canvas. The drawing tool is configured to receive a shape on the drawing canvas, the shape placed on the drawing canvas in a first position by a first user. The system further includes a second drawing tool executable on the second client computing system remote from the first client computing system, the second drawing tool configured to display the drawing document and receive a comment from a second user associated with the shape placed on the drawing canvas by the first user, wherein the first and second users concurrently access the drawing document from the server system.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

Figure 1:
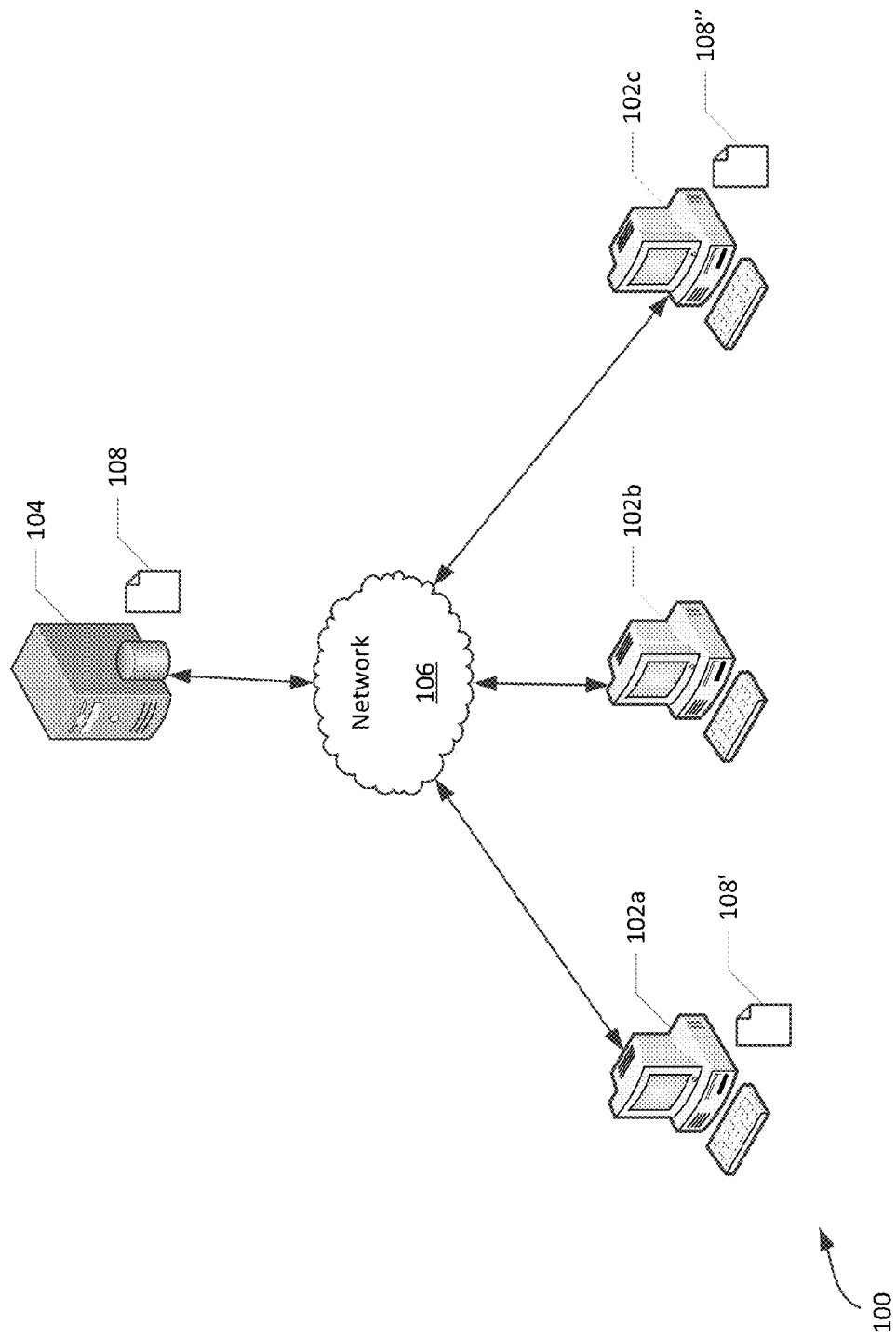
FIG. 1 illustrates an example networked arrangement in which coauthoring in a drawing tool could take place.

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Embodiments of the present invention are directed to methods, systems, and user interfaces configured to provide commenting features in a drawing, including commenting features capable of association with collaboratively-edited drawings. The systems and methods described herein improve collaboration among users accessing a drawing tool by allowing users to view and respond to other users' comments, associate comments with particular drawing objects in a drawing, and communicate comments among coauthors of a particular drawing. In certain embodiments discussed herein, the commenting features of the present disclosure can be provided in a drawing displayed in drawing tool, a web browser representation of a drawing, or a drawing viewer. By providing commenting features available in each of these tools, the systems and methods of the present disclosure allow collaboration among a wider range of individuals, including those not directly involved in the drawing development process, and therefore may not have a copy of the drawing tool software that would otherwise be used for such commenting.

In accordance with the present disclosure, the drawing document is referred to as "collaborative" to indicate that the drawing document can be commented on and edited by more than one user. In embodiments, the drawing document may or may not be coauthored, by which it is intended that two or more users can apply edits or comments associated with features in a drawing document concurrently, without edit locks included within the tool to prevent concurrent editing of a common object, group of objects, or canvas included in a drawing document. Additionally, it is recognized that, in the context of the present disclosure although some embodiments of systems and methods for managing commenting involve commenting features that may be used in a standalone computing system operating a drawing tool, web browser, or drawing viewer. As such, in those embodiments the commenting features are available in any of a variety of these types of systems, and do not require the presence of the drawing tool software to enable commenting.

Referring now to FIG. 1, an example of a networked arrangement 100 is illustrated in which commenting in a collaborative drawing document could take place. In the embodiment shown, the networked arrangement 100 includes a plurality of client devices 102a-c (referred to collectively or individually as client devices 102), communicatively connected to a server device 104 by way of a network 106, such as the Internet. The client devices 102 generally each include some type of software allowing commenting of a drawing document, such as drawing tool software, such as VISIO® drawing and layout software provided by Microsoft Corporation of Redmond, Wash. Alternatively, one or more of the client devices 102 could include web browser software or a drawing viewer version of the drawing tool, in which editing capabilities may be limited. The server 104 can be any of a number of types of computing systems, and in certain embodiments includes collaborative software, such as SHAREPOINT® server software, also available from Microsoft Corporation.

In general the present disclosure is related to situations in which a particular drawing tool, web-browser drawing version, or drawing viewer allows comments to a drawing document, or various features within the drawing document. In some embodiments, the present disclosure contemplates a circumstance in which users of two different client devices 102 intend to access a particular drawing document stored on the server 104, either sequentially or concurrently. In the embodiment shown, client devices 102a and 102c have accessed a document 108, and are managing that document as local documents 108', 108" on those devices, respectively. As users of those respective client devices 102a, 102c edit or comment on the document retrieved from the server 104, the drawing document 108', 108" diverge. However, by synchronizing comments and other data across the two devices 102a, 102c (as well as other devices associated with coauthoring users) via the server 104, and by notifying the coauthoring users of edits made by other users, concurrent editing by coauthors can be managed. The present disclosure relates generally to addition of comments to such a document in collaborative fashion; generally, methods for managing coauthoring edits to the document (e.g. changes to the shapes included within such a drawing document) are discussed in copending U.S. application Ser. No. 13/294,943, entitled "Coauthoring in a Drawing Tool", filed on Nov. 11, 2011, the disclosure of which is hereby incorporated by reference in its entirety.

In some embodiments described herein, the server 104 is configured to manage a list of users of client devices accessing the drawing document 108 for coauthoring and commenting purposes. In the example explained above, for example, the server 104 would include a list of users of devices 102a, 102c, but would not include a user of device 102b in the list. The list of users associated with the drawing document can be used to share notifications of drawing modifications among current coauthors, including comments among those authors. Additionally, the list of users accessing the drawing document and list of comments included in the drawing document can include contact information, so the coauthoring users can contact each other with questions or concerns about ways to resolve any potential conflicts between edits applied by each user.

Figure 2:
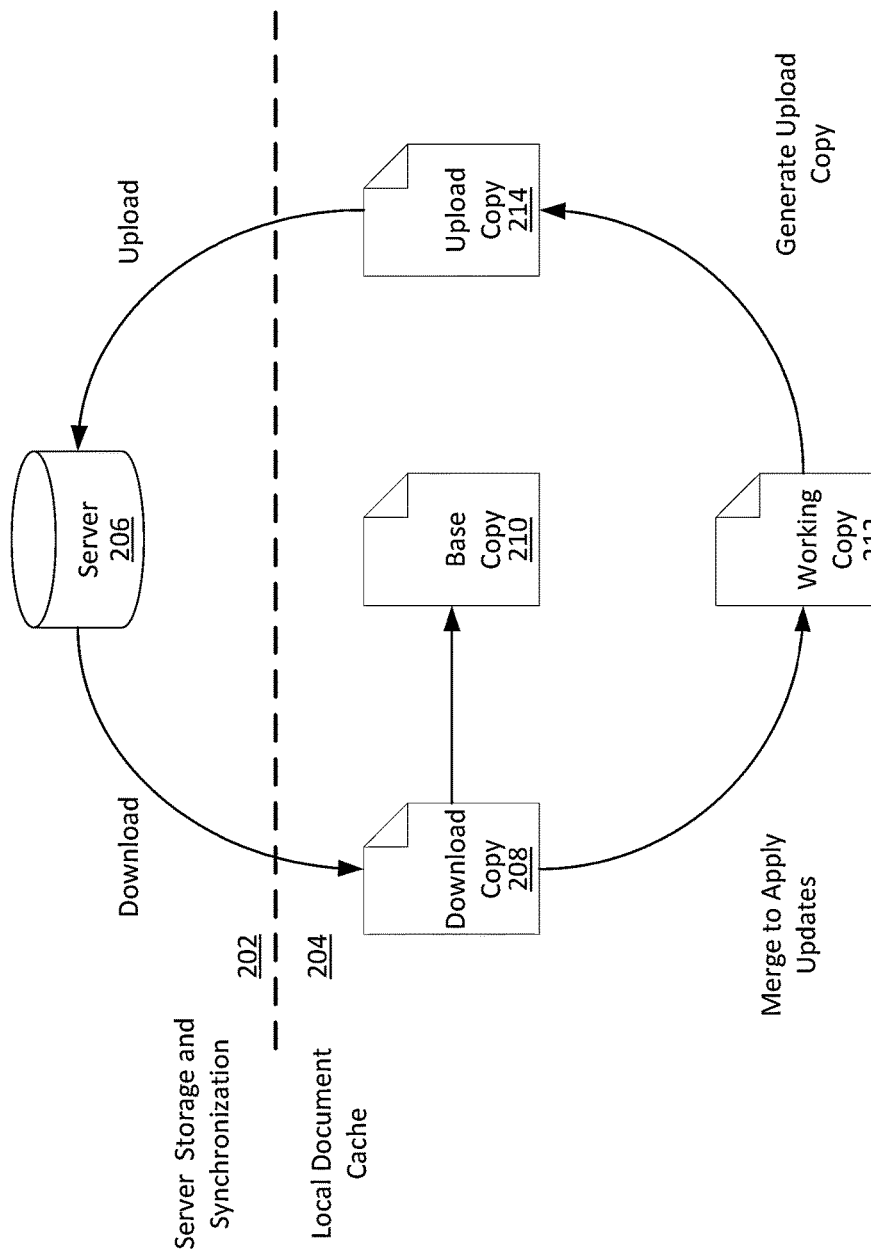
FIG. 2 illustrates an example system for management of coauthoring within a drawing tool, including management of commenting among coauthors.

In general, to achieve conflict resolution and comment editing systems relative to a drawing object as described herein, maintenance of an original drawing is supported, as well as maintenance of the edited drawings of each coauthoring user to determine when and where such conflicts take place. As illustrated in FIG. 2, a system 200 for managing coauthoring in a drawing tool is shown, according to an example embodiment. The system 200 generally includes a server storage and synchronization area 202 interfaced with a local document cache 204, such as would be provided in the client-server arrangement illustrated between any of the client computing devices 102 and server 104 of FIG. 1.

In the embodiment shown, the system 200 includes a server storage area 206 in which a copy of a drawing can be stored. The server storage area 206 can be, in such embodiments, a database or server workflow management system, such as SHAREPOINT® server software, also available from Microsoft Corporation. A client 102 can retrieve a download copy 208 of the drawing from the server storage area 206. The download copy 208 corresponds to a latest copy available in the server storage area 206. To preserve the client's knowledge of the current state of the document as maintained in the server storage area 202, a base copy 210 is created from the download copy 208, and represents the copy of the download that occurred after the last successful merge of the client and server copies took place (as further discussed below). A working copy 212 is also created from the download copy 208, and is used for local editing/modification by a user. As a user edits the working copy 212 of the drawing, that user may wish to upload his/her changes back to the server to be saved. That user can select a "save" option within a drawing tool, which will in turn create an upload copy 214 of the drawing, which can be returned to the server storage area 206.

When the user of the client computing device 102 adds comments to a document, those comments can be included within a portion of the drawing document that is configured to be accessible within a variety of types of tools, including the drawing tool, a web browser, or a viewer tool. For example, the comments can be stored in and managed by metadata used to manage coauthoring features, as described in co-pending U.S. patent application Ser. No. 13/294,943, titled "Coauthoring in a Drawing Tool," filed Nov. 11, 2011. Alternatively, the full document could be stored to include the comments. Although in the embodiment discussed in connection with FIG. 2 all portions of a drawing document may be downloaded to a client, in circumstances where the client device 102 only accesses the drawing document using a web browser or viewer, or only updates a comment in a drawing tool, only the portion of the document that illustrates the current visual display of shapes and a feature allowing commenting are provided, and only portions thereof that are updated with comments are required to be transmitted back to a server to be saved.

Figure 3:
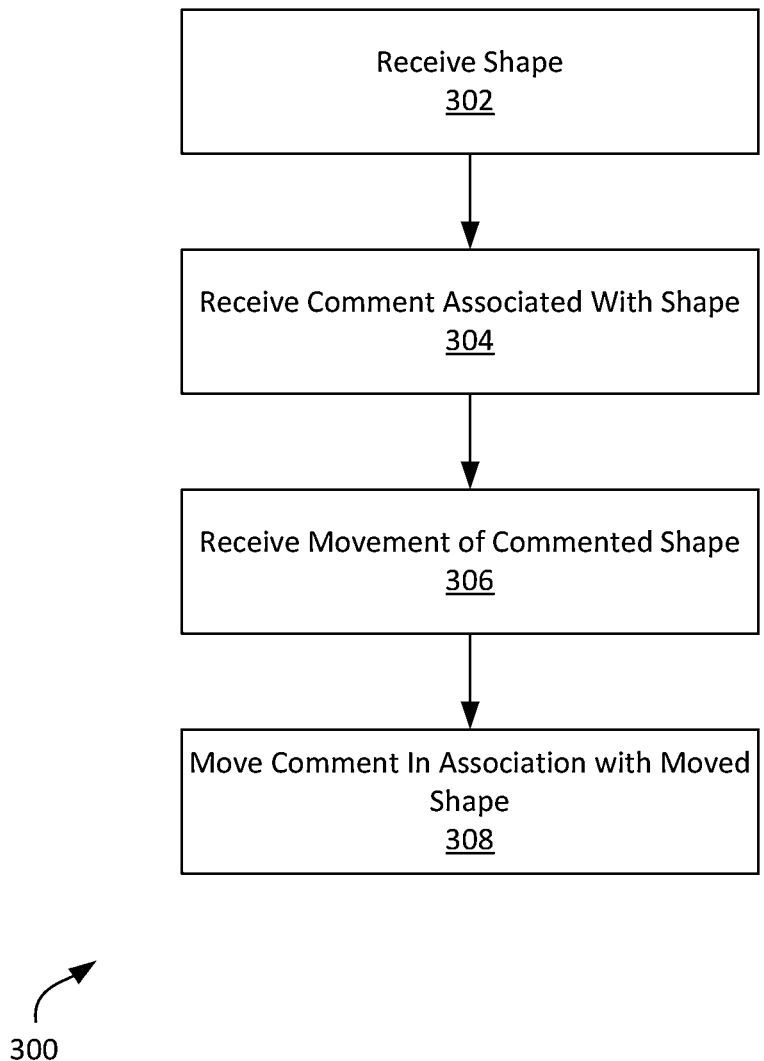
FIG. 3 is a flowchart of a method for commenting within a drawing, according to a possible embodiment.
Figure 4:
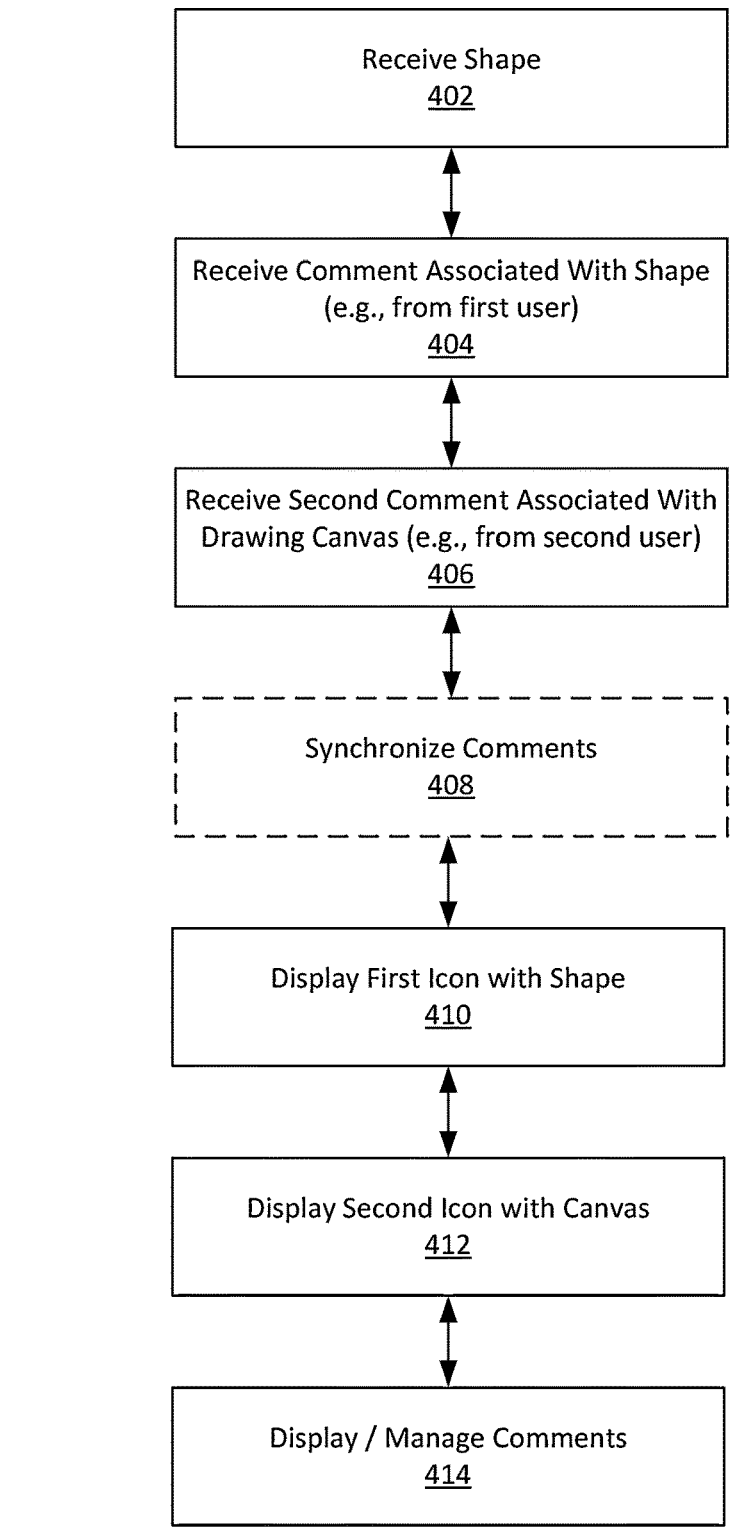
FIG. 4 is a flowchart of a method for managing collaborative and coauthored comments, according to a possible embodiment.

Referring now to FIGS. 3-4, methods for managing commenting among collaborative users are shown, according to embodiments of the present disclosure. The methods illustrated in FIGS. 3-4 generally can be performed at one or more client devices, such as any of devices 102*a-c* of FIG. 1, or any stand-alone client device, such as a desktop, laptop, or mobile computing system, either connected to or disconnected from a server system or other computing system for at least a portion of the time the drawing document is edited or commented upon. Additionally, although aspects of the methods disclosed herein generally will involve certain editing steps to be performed using a drawing tool (e.g., direct editing of drawing shapes within a drawing document), other steps (e.g., adding or editing comments) can be performed using such a tool or a web viewer or other type of drawing viewer.

Referring to FIG. 3, a flowchart of a method 300 for commenting within a drawing is shown. In the embodiment shown, the method 300 includes receiving a shape on a drawing canvas of a drawing document (step 302). In connection with the present disclosure, receiving the shape on the drawing canvas generally occurs within a drawing tool, because editing of a drawing document directly typically involves use of desktop drawing tool software, rather than, for example, only a drawing viewer. The method also includes receiving a comment associated with the shape (step 304). The comment associated with the shape will generally include a name of a commenting user. If the same user added the shape and commented on the shape, that user's name will be associated with the shape. However, if the drawing document is transmitted between a first user and a second user after the shape has been placed on the drawing canvas and the second user inserts a comment into the drawing document in association with the shape. In various embodiments of the present disclosure, receiving a comment could occur, for example, in either a drawing tool or a drawing viewer, such as a client drawing viewer or web browser.

The method 300 also includes receiving an indication of movement of the shape from a first position to a second position, for example on the same drawing canvas, or sheet, or another canvas within the drawing document (step 306). This may occur, for example, when a user of a drawing tool opts to move a shape that has a comment previously associated with it. The method 300 includes, in response to the movement of the shape, automatically moving the comment closer to the second position of the shape (step 308).

Accordingly, as shapes are moved within a drawing document, comments associated with those shapes can be moved as well, to ensure clear graphical correspondence between shapes in a drawing document and comments associated with those shapes. Examples of user interfaces depicting drawing shapes and associated comments are described below in connection with FIGS. 5 and 16.

Furthermore, and in accordance with the general method illustrated in FIG. 3, it is understood that additional users besides the one who edited or created the drawing document can insert comments into that drawing document. As additional users insert comments into the drawing document associated with various drawing objects (e.g., shapes included on a drawing canvas or the drawing canvas itself), those users can have their names and/or contact information displayed in association with those elements on the drawing document. Additionally, users can serially add comments in response to each others' comments or on different aspects of the drawing document, as illustrated in further detail in the user interfaces of FIGS. 9-15 and 17-18.

Referring now to FIG. 4, a method 400 is described that provides for management of collaborative and coauthored comments, according to a possible embodiment. The method 400 generally involves receiving a shape on a drawing canvas (step 402); this generally corresponds to step 302 of FIG. 3. The method also includes, for example, receiving a first comment from a user, such that the comment is associated with the shape (step 404); this additionally corresponds to step 304 of FIG. 3. The method 400 also includes receiving a second comment from a user, which is associated with the drawing canvas (step 406). In some other embodiments, such comments could be considered comments that are not otherwise associated with any particular shape or other drawing object, but are associated with the drawing as a whole. In various embodiments, the second comment could be associated with the drawing canvas by the same user as the user applying a comment to a shape in step 404, or a different user who accesses the drawing document either concurrently with, before, or after the user who adds a comment in association with a shape. Additionally, as discussed above, the commenting received in either of steps 404 and 406 can occur within a drawing tool, web viewer, or desktop viewer.

In the embodiment shown, the method 400 optionally includes synchronizing the comments and/or edits made in steps 402-406 with a server version of the drawing document, for example in the circumstance where the drawing is stored on a server and managed as a document accessible to many users and capable of supporting coauthoring (step 408). During synchronization, the comments inserted into the document can be transmitted to a server for viewing by other client devices, and comments made by users of other client devices can be updated to the local drawing document as shown to the local user.

In various embodiments, the synchronization process of step 408 can occur in different ways. For example, synchronization may occur periodically or upon selection of a save operation within a drawing tool. If comments are added in a web browser or local viewer version of the drawing document, the viewer may include a prompt to receive a user indication that the comment has been entered (e.g., an "OK" button, or other user input element) to synchronize those comments with a server version of the drawing document. Additionally, for such viewer versions of the drawing document, the document itself may be updated, and the comments saved to a server version of the drawing document, if that user selects to update the viewed version of the drawing, for example by selecting to refresh the view presented in the browser or viewer.

The method 400 includes displaying a first icon in association with the shape (step 410), and displaying a second icon in association with the canvas (step 412). Generally, and as illustrated in FIG. 5, discussed below, as comments are added to a drawing document and associated with particular portions of the drawing document, icons can be added to the drawing document to indicate to users of that drawing document that the user, or a different user, has added a comment associated with that particular drawing element.

After comments are added to the drawing document, users accessing that drawing document have flexibility in the manner in which they interact with such comments. As such, in some embodiments, the systems disclosed herein can manage comments (step 414), for example by receiving edits from users regarding either their own comments or other users' comments, or by receiving feedback from users regarding comments (e.g., to reply to the comment or to indicate that the edit noted in the comment is completed). In various embodiments, and as illustrated in the Figures below, comments can be displayed and managed either within the drawing canvas display or in a separate comments panel, selectable by a user. Furthermore, in various embodiments, the comment itself may or may not be displayed at all times; rather, a user may elect to hover over or select the icon displayed in association with the drawing object to which the comment is associated to enable the comment to be displayed.

Figure 5:
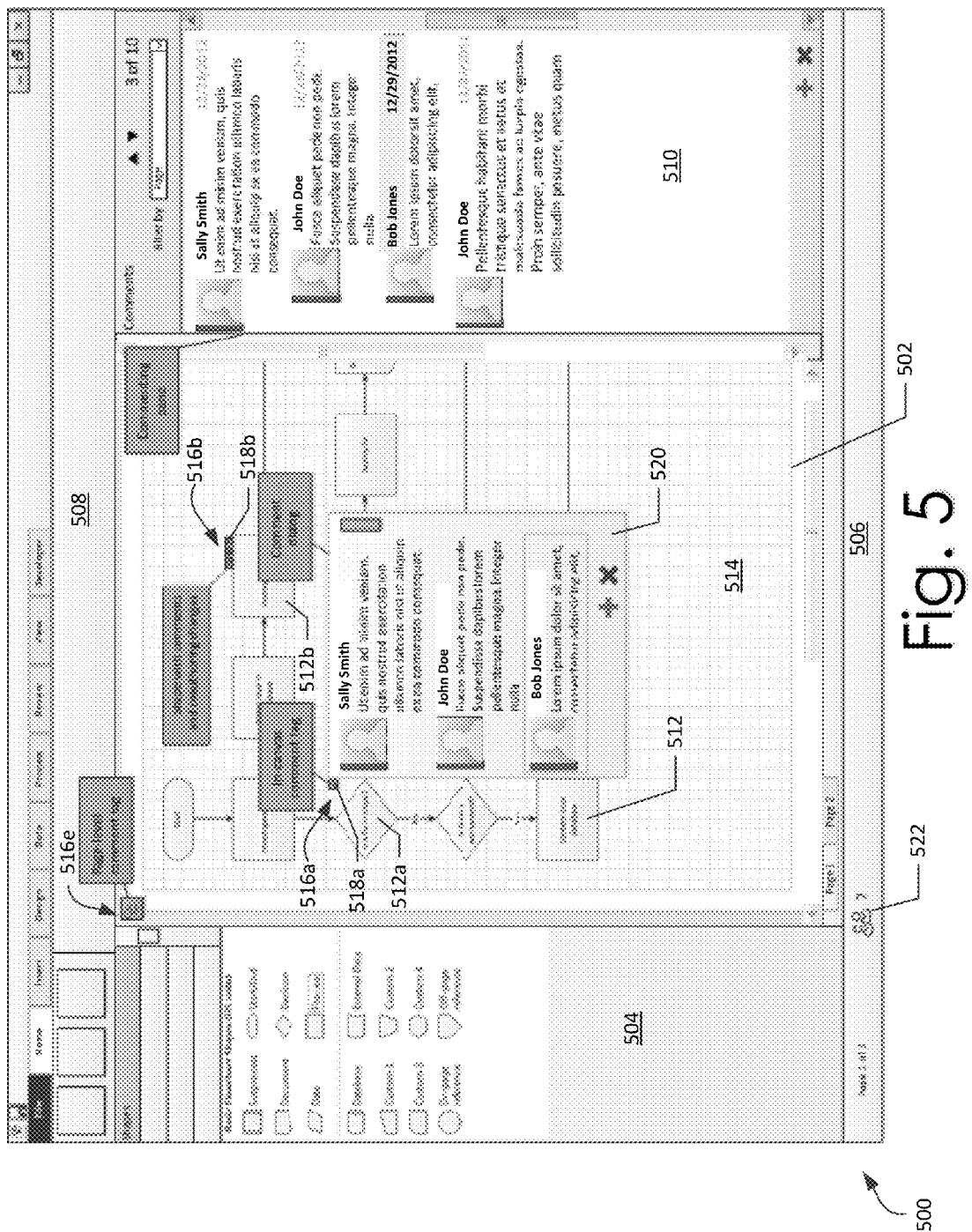
FIG. 5 is an example schematic user interface of a drawing tool supporting coauthored commenting, according to an example embodiment.

Referring now to FIG. 5, an example schematic of a user interface 500 of a drawing tool is shown, according to a possible embodiment. In the embodiment shown, the user interface 500 supports collaborative commenting, in conjunction with the principles of the present disclosure. Additionally, the user interface 500 represents an interface that supports coauthoring of a drawing document, including use of notification features such as are described in co-pending U.S. patent application Ser. No. 13/294,943, titled "Coauthoring in a Drawing Tool," filed on Nov. 11, 2011, the disclosure of which is hereby incorporated by reference in its entirety.

In the embodiment shown, the user interface 500 includes a drawing panel 502 displaying one or more drawing canvases incorporated into a drawing document, and a side panel 504 in which shapes can be displayed for selection and inclusion into the drawing. The user interface also includes a toolbar 506 along a bottom edge of the drawing panel 502 and side panel 504, as well as a ribbon panel 508 along a top edge of the user interface. Optionally, the user interface also includes a commenting panel 510 along a right side of the drawing panel 502.

Within the drawing panel 502, a user may place and edit a variety of types of shapes 512 on a drawing canvas 514, using tools depicted in the side panel 504 and ribbon panel 508, as is known in the art. In the embodiment shown, a flowchart including a variety of drawing shapes 512 is shown. Associated with one or more of the shapes and optionally as associated with the drawing canvas as well, a notification feature 516 can be depicted, with which one or more recent changes or comments are noted. Each notification feature 516 can include one or more icons 518, including an icon intended to indicate the existence of a comment. In the embodiment shown, two drawing shapes 512*a* and 512*b* are depicted as associated with comments; the first drawing shape 512*a* is associated with a first notification feature 516*a*, including an icon 518*a* labeled as "in-canvas comment tag." A commenting dialog 520 is also displayed in association with the icon 518*a*, and the drawing shape 512*a*, such that if the drawing shape 512*a* is moved, the commenting dialog 520 will move as well, to be placed in proximity to the drawing shape, as noted above in FIG. 3. Additional details regarding features of the commenting dialog 520 are discussed below, in connection with FIGS. 9-11.

The second drawing shape 512*b* is associated with a second notification feature 516*b*, which includes a number of icons 518*b-d*, representing both the existence of a comment and the existence of coauthoring changes, either before or after a most recent save made by a coauthor, as described in co-pending U.S. patent application Ser. No. 13/294,943, titled "Coauthoring in a Drawings Tool," filed Nov. 11, 2011 previously listed. Additionally, a third commenting icon 516*e* is displayed in a top lefthand corner of the drawing canvas 514, indicating a comment that was made that relates to the drawing overall.

In the toolbar 506, an indicator 522 includes an indication of a number of users currently accessing the document, for example in a coauthoring embodiment of the drawing tool. Other notifications could be included within the toolbar 506 as well. Additionally, the ribbon panel 508 includes a number of tabs allowing a user to edit, save, or modify the drawing. In some embodiments, the ribbon panel 508 can include a commenting ribbon useable to track and add, edit, or delete comments. An example of a commenting ribbon is illustrated in FIG. 6.

The commenting panel 510 includes a cumulative list of the comments included in a drawing document, ordered by date and time added, as well as by page on which those comments are located. The commenting panel 510 can also be used to view, edit, sort, add, or delete comments associated with the drawing document, and includes information associated with the user making the comment. Additional details regarding the commenting panel 510 are discussed below in connection with FIGS. 12-15.

Although in the embodiment shown both the commenting panel 510 and a commenting dialog 520 are illustrated, in typical embodiments comments will be illustrated in one of these two arrangements, to avoid duplication of comments within the user interface. Generally, one of the commenting panel 510 and commenting dialog 520 arrangements is selectable by a user, to preserve space within the user interface.

Figure 6:
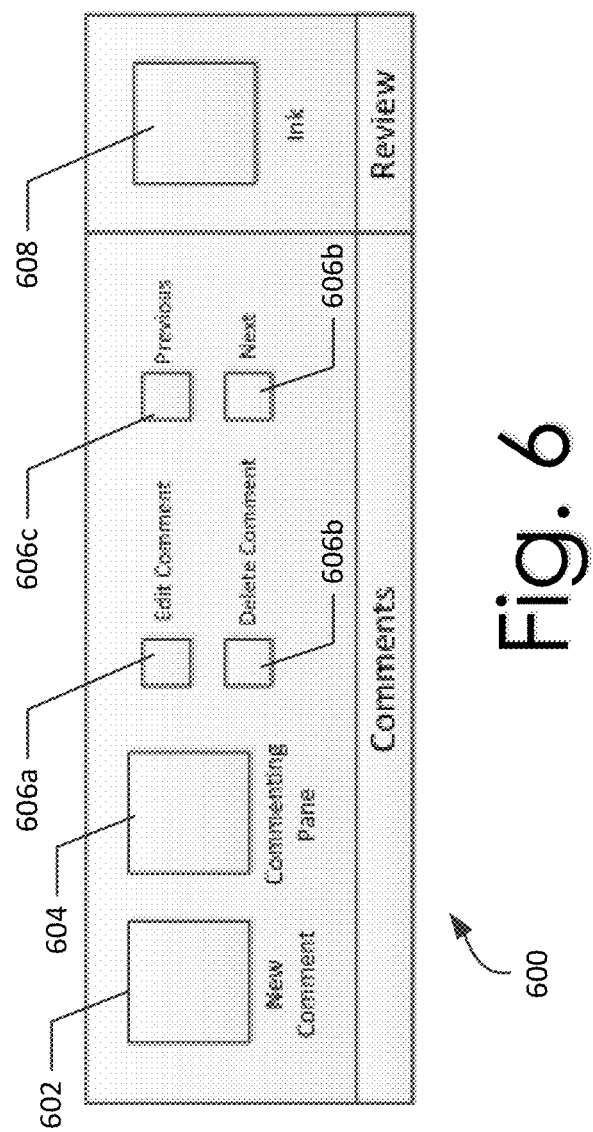
FIG. 6 is an example schematic depiction of a commenting ribbon useable within a user interface, such as the one shown in FIG. 5.

Referring now to FIG. 6, an example schematic of a commenting ribbon 600 useable within the user interface 500 of FIG. 5 is shown. The commenting ribbon 600 includes a new comment button 602, a commenting pane button 604, and comment review buttons 606*a-d*. The new comment button 602 allows a user to insert a comment into the drawing, either with respect to a currently selected drawing shape or the drawing canvas overall. The commenting pane button 604 allows the user to select or deselect use of a commenting panel or commenting dialogs displayed in the drawing canvas, such as is shown in the commenting panel 510 and commenting dialog 520 of FIG. 5.

The comment review buttons 606*a-d* allow a user to edit, delete, or navigate among comments within the drawing. Additionally an ink button 608 allows a user to "handwrite" on the drawing, for example to insert edits that can be included on the drawing.

Figure 7:
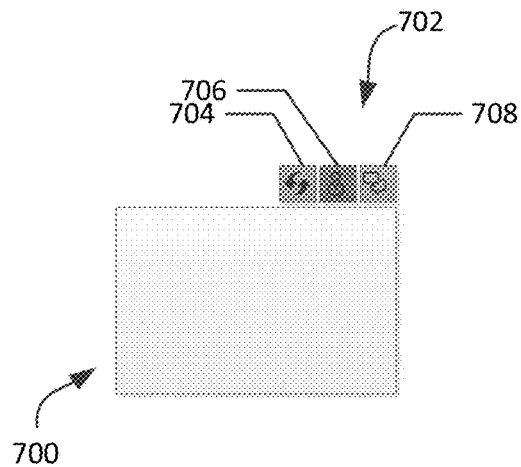
FIG. 7 illustrates an example drawing object and notification feature presented to a coauthoring user of a drawing tool, according to an example embodiment.
Figure 8:
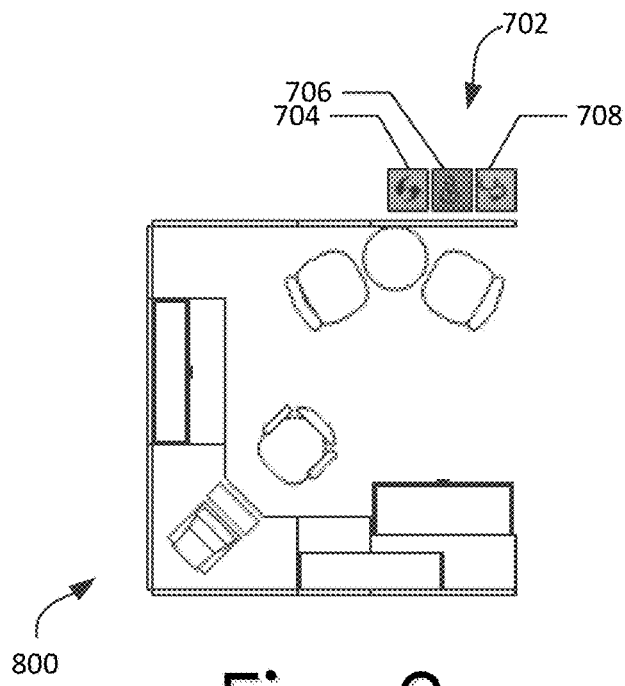
FIG. 8 illustrates a notification feature associated with a group of drawing objects defined by the drawing tool, according to an example embodiment.

Referring now to FIGS. 7-8, example notification features including commenting icons are illustrated, depicting an indication that a comment exists that is associated with the depicted shape. In general, the notification features illustrated in these figures are affiliated with specific drawing objects, indicating that the drawing object is in use or is otherwise edited by a user. FIGS. 7-8 generally illustrate a drawing object with an associated notification feature 702. The notification feature 702, in each example, includes a plurality of fields, including an update notification field 704, a coauthor notification field 706, and a comment notification field 708. The update notification field 704 and coauthor notification field 706 generally relate to notifying coauthors of changes that have recently occurred in the drawing, and are generally managed within the drawing tool. The comment notification field 708 indicates the existence of a comment in association with the shape or drawing canvas. FIGS. 7-8 also illustrate positioning of the notification feature 702 relative to different drawing objects. In FIG. 7, the notification feature 702 is presented along a top right corner of a drawing object 700. In FIG. 8, the notification feature 702 is presented in association with a group object 800 (illustrated as a cubicle). In this arrangement, the group object has been previously grouped by the drawing tool; accordingly any change to a sub-element of the object 800 is propagated as a change to the object overall, and the notification feature 702 is updated accordingly.

Figure 9:
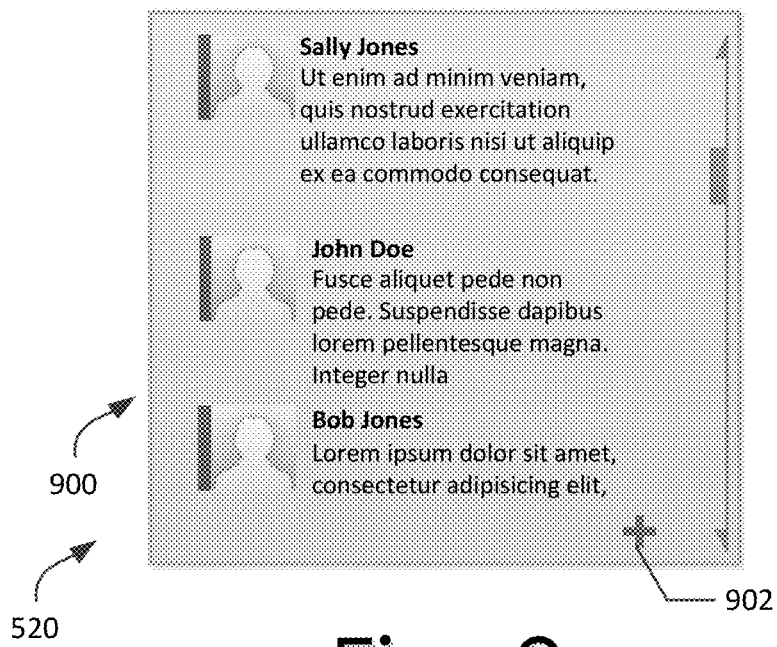
FIG. 9 illustrates an example user interface capable of display within a drawing tool in association with a drawing object.
Figure 10:
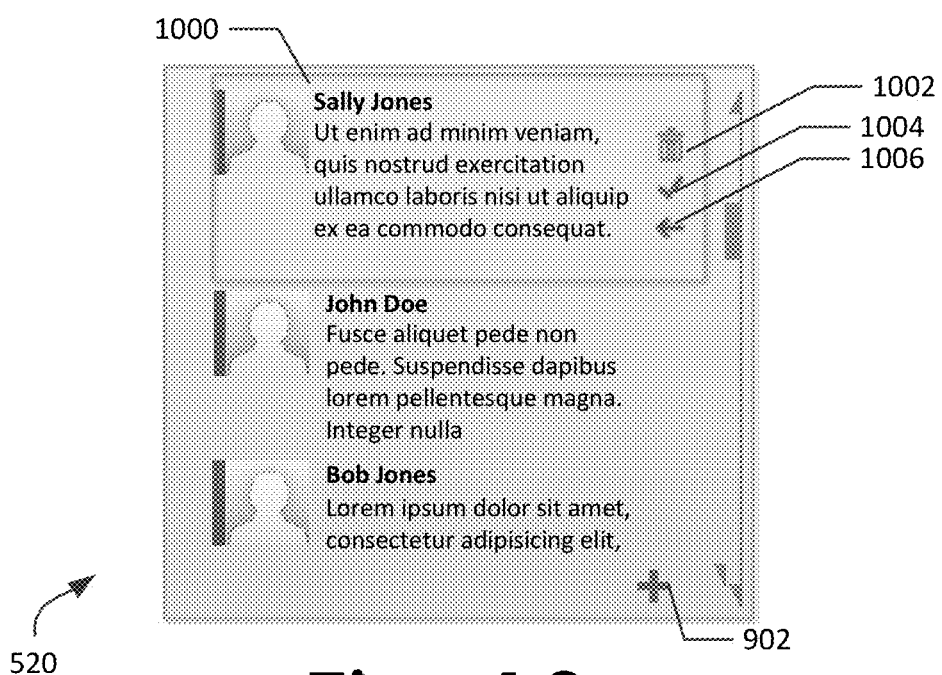
FIG. 10 illustrates the user interface of FIG. 9 including a selected comment.
Figure 11:
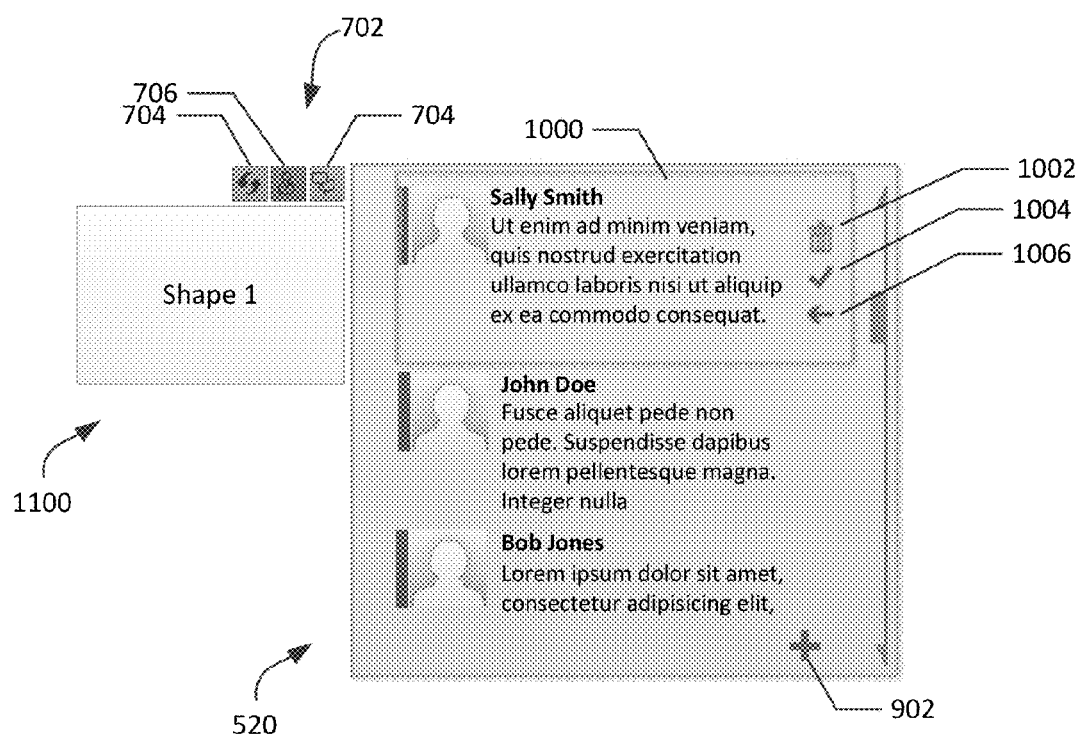
FIG. 11 illustrates the example user interface of claim 9 placed in association with a drawing object and notification feature.

Referring now to FIGS. 9-11, details regarding a commenting dialog 520 are illustrated. In the embodiment shown in FIG. 9, the commenting dialog 520 includes a listing of comments 900 that a user can scroll through, as well as an add comment button 902 that can be used to add a new comment associated with the currently-selected shape or canvas. Generally, each comment in the commenting dialog includes a collection of rich text data, and is typically of limited length (e.g., up to about 64 k bytes in size). Additionally, each comment can be associated with a commenter's user profile, including a name and image of the user, as well as a date on which the user made the comment.

FIG. 10 illustrates the commenting dialog 520 with a comment 1000 selected. In this Figure, the comment 1000 has associated with it a delete option 1002, a completed option 1004, and a reply option 1006. The delete option 1002 allows a user to remove the comment, while the completed option 1004 allows the user to indicate that the comment has been addressed, and will, if selected, cause the comment to be "grayed out" or inactive within the dialog 520. The reply option 1006 allows a user to create a comment that is in specific reply to the selected comment.

FIG. 11 illustrates relative location of the commenting dialog 520 to a drawing shape 1100. As illustrated, the drawing shape 1100 has a notification feature 518 and associated icons 518, including a commenting icon indicating that comments exist associated with the drawing shape 1100. The commenting dialog 520 can appear, for example, upon selection of the commenting icon. Additionally, when the drawing shape 1100 is placed along an edge of a drawing panel, the commenting dialog 520 can be placed in other locations relative to the shape to which it is associated.

In each of FIGS. 9-11, each comment includes an identification of a user, such that the user can be viewed and selected to identify contact information for that user. As such, a commenting user can be identified and contacted for clarification, as determined to be necessary by the user.

Figure 12:
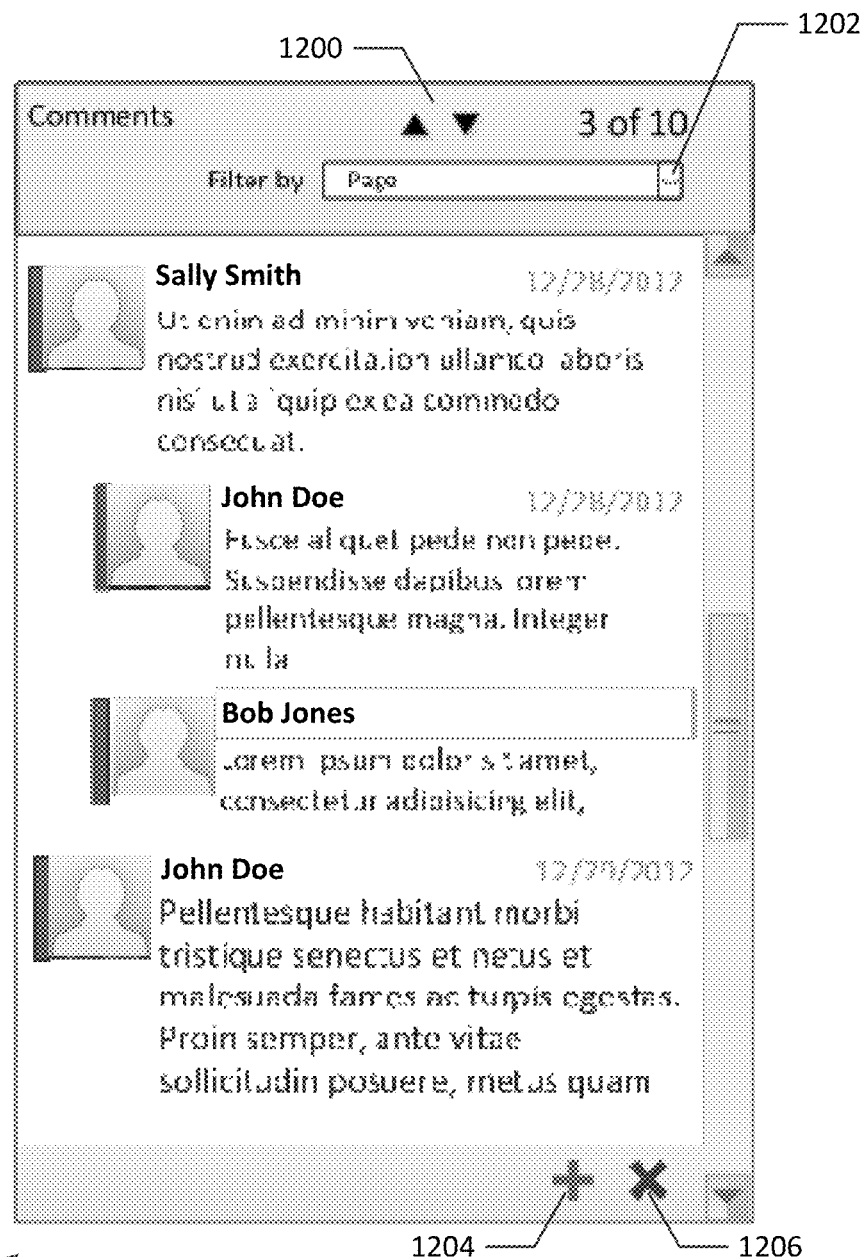
FIG. 12 illustrates an example comment panel useable in a drawing tool, according to a possible embodiment.
Figure 13:
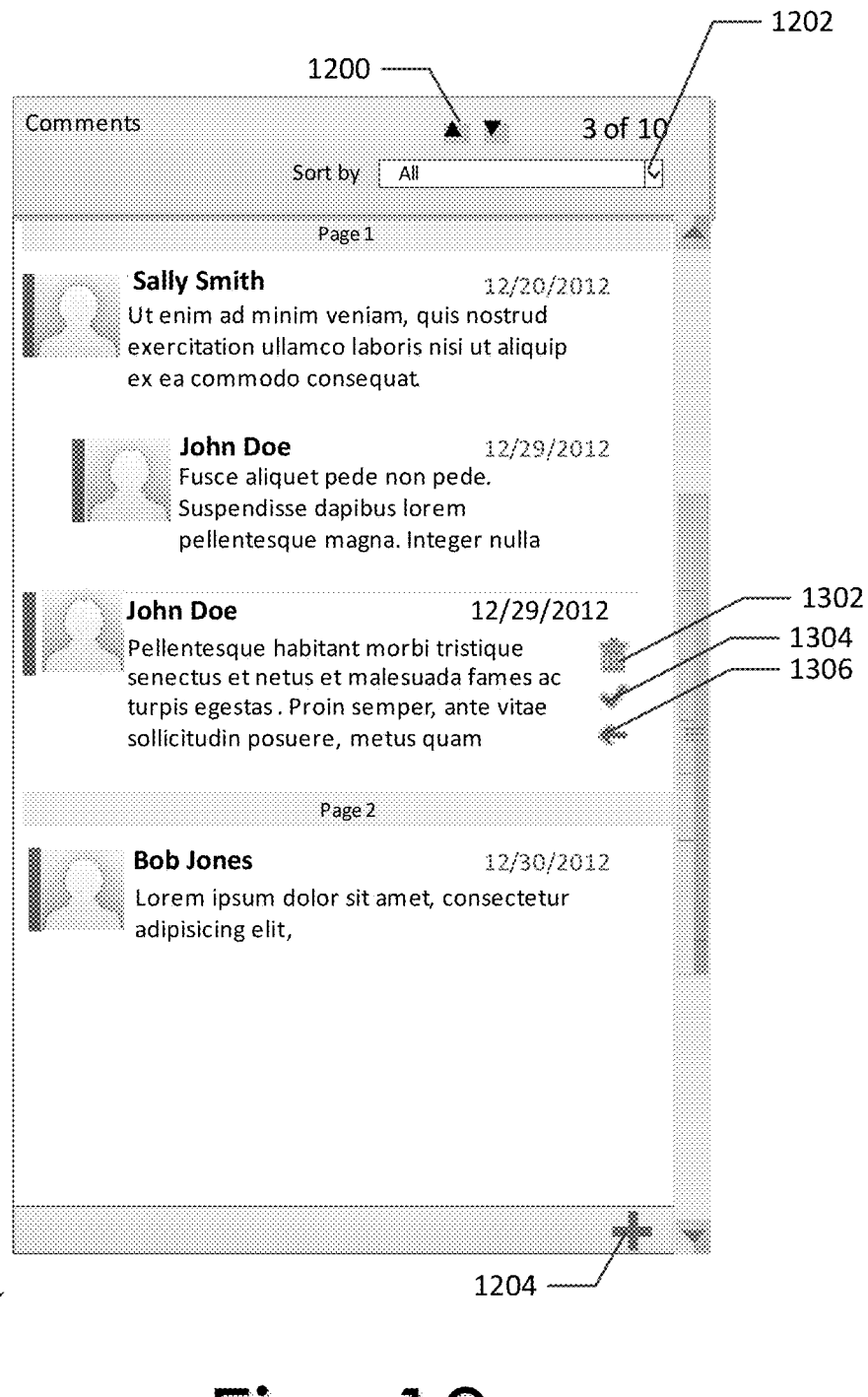
FIG. 13 illustrates the example comment panel of FIG. 12, including a selected comment and illustrating page identifications regarding drawing canvases of a drawing document.
Figure 14:
FIG. 14 illustrates the example comment panel of FIG. 12, sorted by comment thread.
Figure 15:
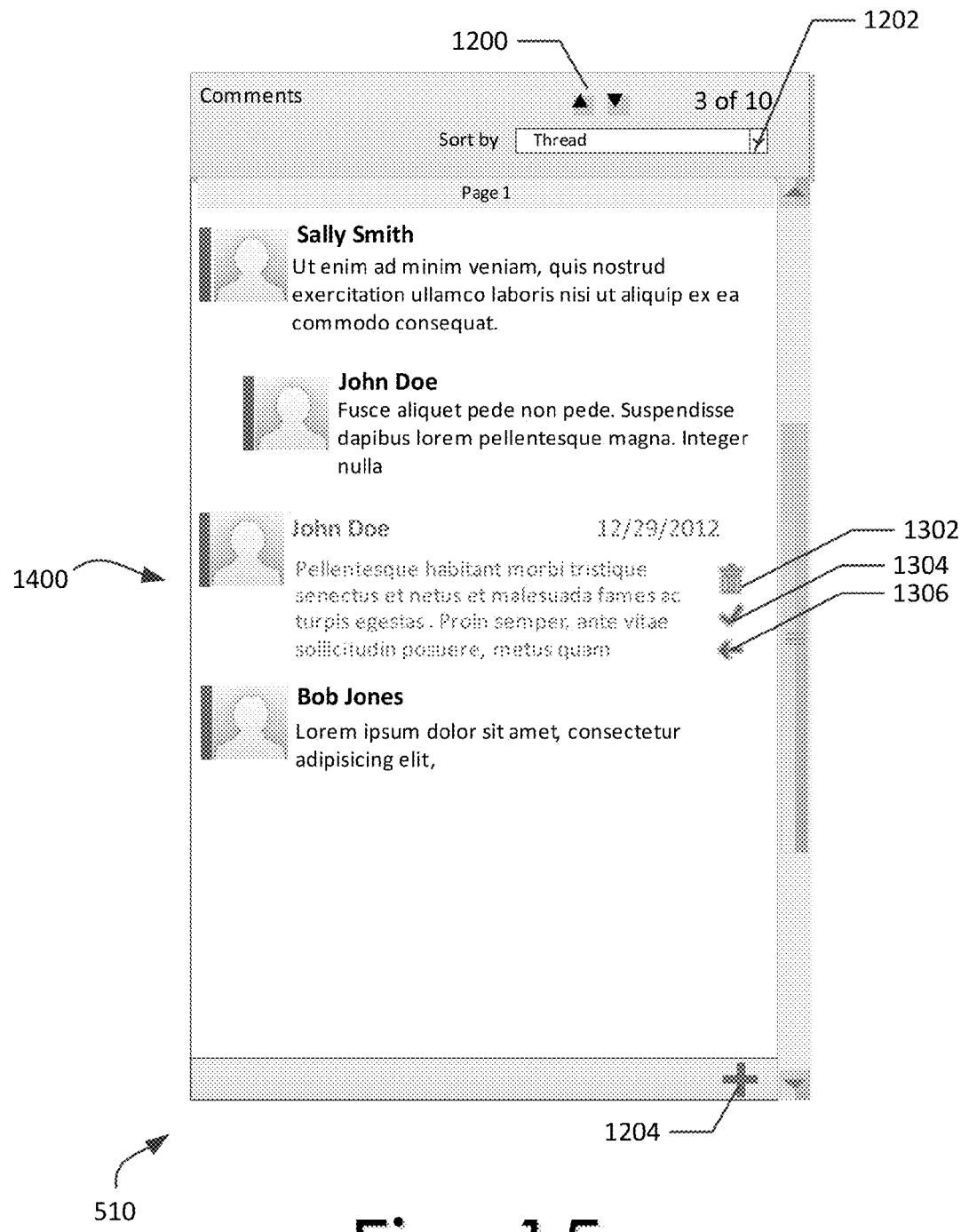
FIG. 15 illustrates the example comment panel of FIG. 15, including a comment addressed and completed, according to an example embodiment.

Referring to FIGS. 12-14, analogous commenting user interface regions are shown, illustrating features of a commenting panel 510. The commenting panel 510 includes generally analogous features to and can be used in substitute for the commenting dialog 520, as described above. In the embodiment shown in FIG. 12, the commenting panel 510 displays all of the comments associated with a particular drawing document, including comments associated with one or more drawing shapes. In the embodiment shown, the commenting panel 510 includes a header region that includes navigation arrows 1200 allowing a user to step through the comments in order, as well as a filtering drop-down box 1202 that allows a user to filter the comments by page, commenter, thread, or other order or criteria. The commenting panel 510 also includes add and delete comment options 1204, 1206. In FIG. 13, the commenting panel 510 is unsorted, illustrating that comments across multiple drawing canvases can be included and traversed using the panel. As discussed above with respect to the commenting ribbon 520, when a comment is selected a delete option 1302, a completed option 1304, and a reply option 1306 are displayed. In FIGS. 14-15, the commenting panel 510 is sorted by thread, with one of the comments 1400 "grayed out" because a user had selected an associated completed option 1304. Each of the comments is otherwise as discussed above in connection with FIGS. 9-11.

Referring now to FIGS. 5-15 generally, it is recognized that, when using a drawing tool as depicted, coauthors may also comment on a particular drawing document, and therefore it is possible that one user may be editing a comment while another user is intending to delete that comment. When one author deletes a comment another author is editing or two authors edit a comment simultaneously, both sets of changes will be persisted as a separate comment rather than merging or losing changes. Each comment will contain the personal information for the most recent user. Additionally, if the shape to which a comment is associated is deleted, the comment and all other related comments are deleted as well. Otherwise, as conflicts occur, they are typically resolved on a "last edit wins" basis.

Figure 16:
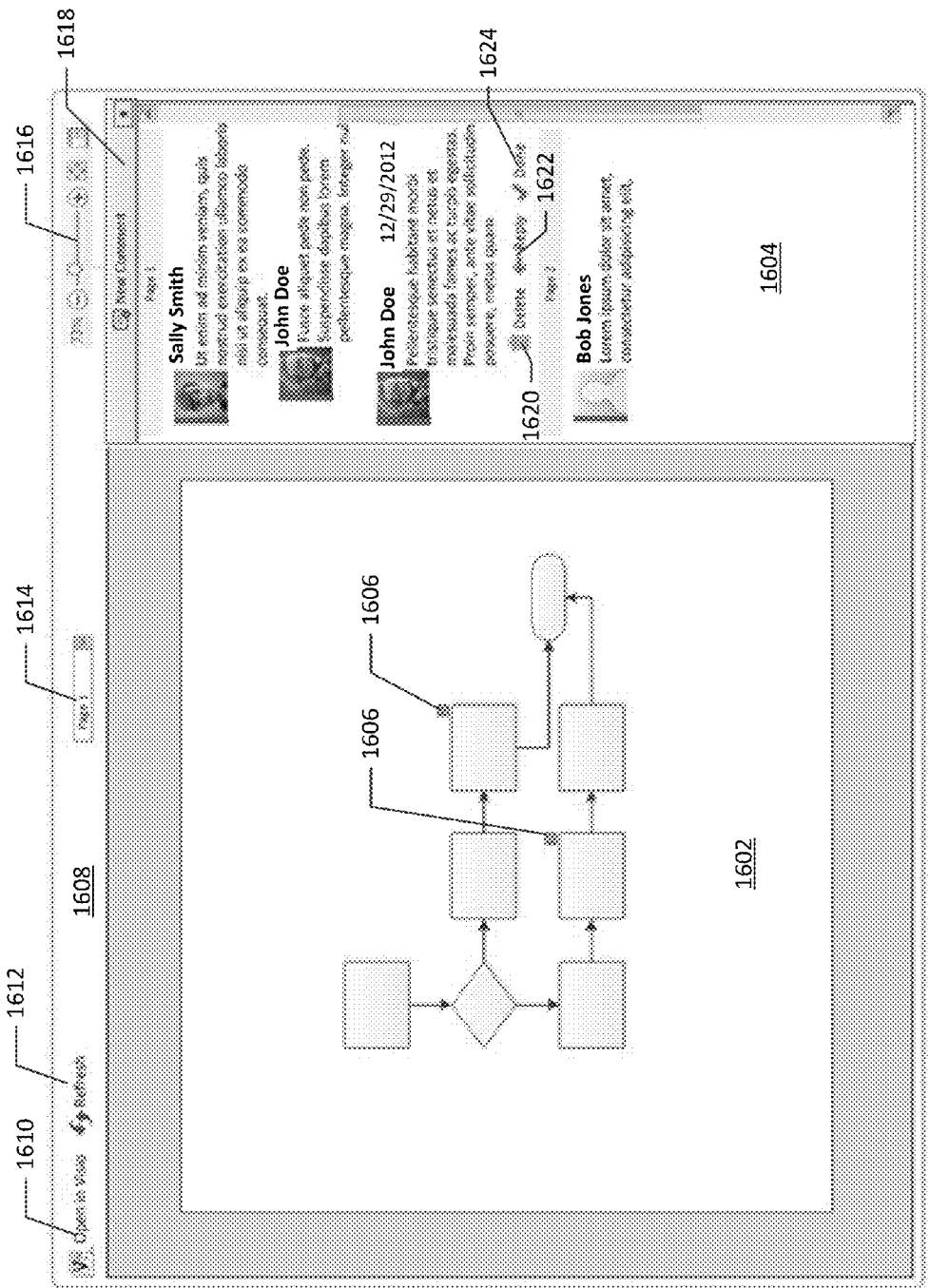
FIG. 16 is an example schematic user interface of a web browser depiction of a drawing document supporting coauthored commenting, according to an example embodiment.
Figure 17:
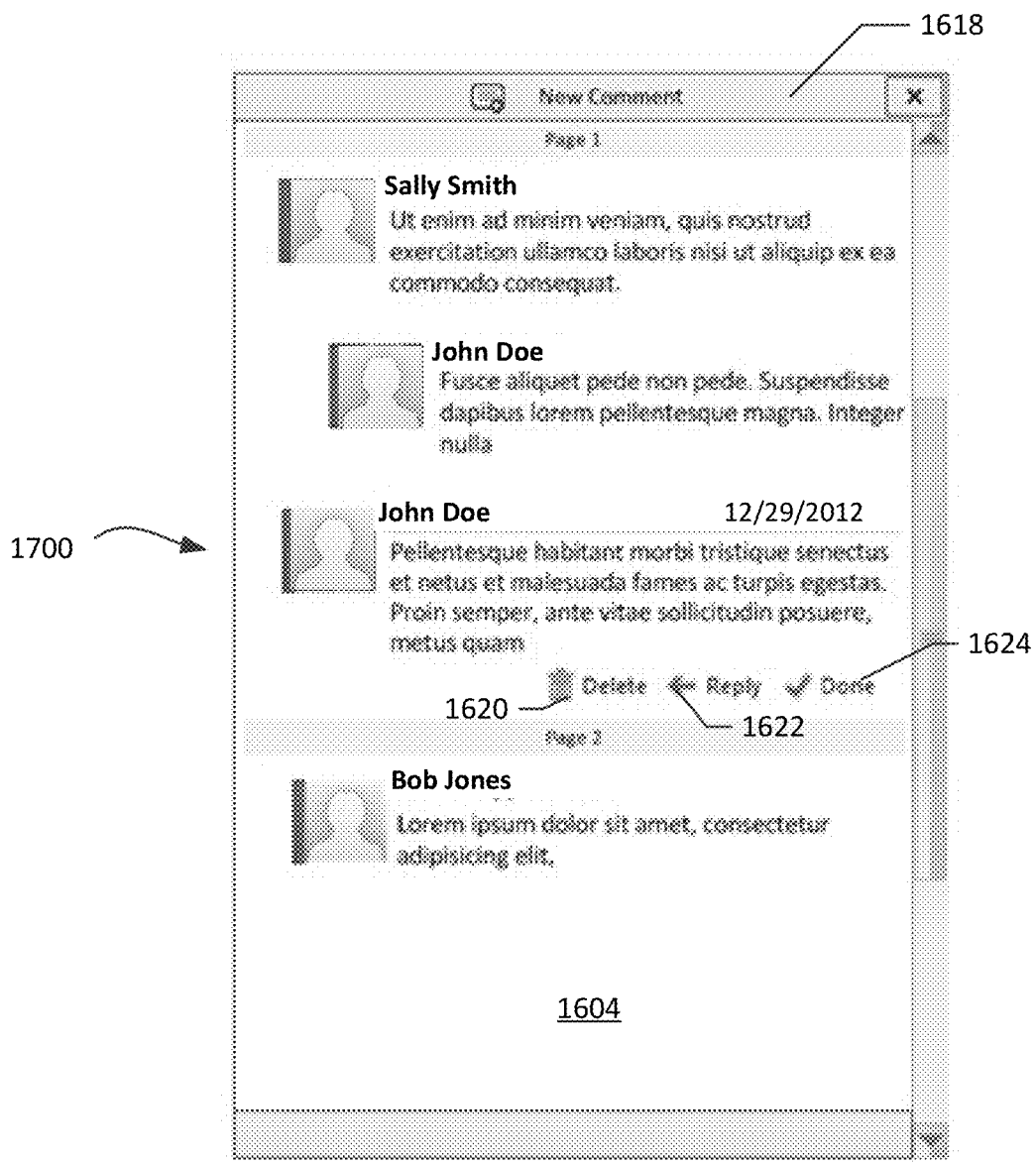
FIG. 17 illustrates an example comment panel useable in a web browser depiction of a drawing document, according to a possible embodiment.
Figure 18:
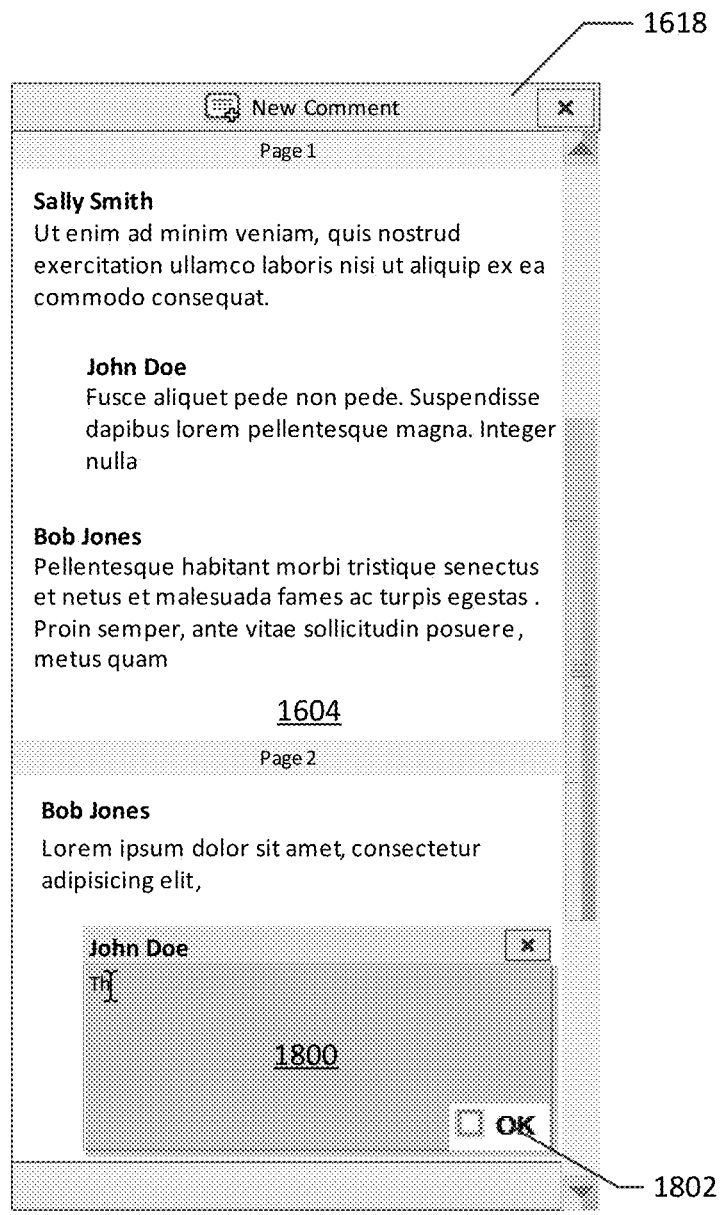
FIG. 18 illustrates the example comment panel of FIG. 17 including a field useable to generate response comments, according to a possible embodiment.

Referring now to FIGS. 16-18, example user interface features associated with a "viewer" version of the document are shown, such as might be available in a desktop drawing viewer or web page drawing viewer tool, according to an example embodiment. In the embodiment shown in FIG. 16, a user interface 1600 includes a separate drawing frame 1602 and comment frame 1604, allowing the reviewing user to view the drawing in the drawing frame 1602, while allowing the reviewer to either view or edit comments in the comment frame 1604. In this embodiment, one or more shapes in the drawing frame 1602 can have associated commenting icons 1606 displayed nearby, indicating that comments exist associated with those shapes.

In the embodiment shown, a toolbar 1608 displays a native copy download option 1610 that allows a user to download a native version of the drawing document, such that the drawing document can be edited within a drawing tool. Additionally, a refresh option 1612 allows a user to refresh the view in the drawing frame 1602 and comment frame 1604, to see any changes made by coauthoring users. A page selection option 1614 allows the user to navigate among pages, or canvases, within the drawing document, and a set of viewing tools 1616 allow the user to zoom, resize, maximize, or otherwise edit the viewing size of the drawing within the drawing frame 1602.

In the embodiment shown, a commenting frame 1604 includes a listing of comments, as well as a new comment option 1618 which allows a user to add a new comment to a selected item or to the page overall. A selected comment in the commenting frame 1604 includes, similarly to the arrangement in the drawing tool, a delete option 1620, a reply option 1622, and a completed option 1624. As illustrated in FIG. 17, a selected comment 1700 can be highlighted in the commenting frame 1604. As seen specifically in FIG. 18, a reply comment will be displayed within a subframe 1800 that appears upon selection of the reply option 1622, and is saved upon selection of an "OK" button 1802 within the subframe.

In general, and referring to FIGS. 1-18 generally, it can be seen that the commenting features described herein, and as made available within a drawing tool or viewer allow a greater number of individuals to provide comments relating to drawing documents, and provide users of a drawing tool greater flexibility in identifying particular aspects of a drawing document with which to associate comments. Accordingly, the methods and systems of the present disclosure improve collaboration in a drawing tool, in both serially-edited and coauthored document arrangements.

Figure 19:
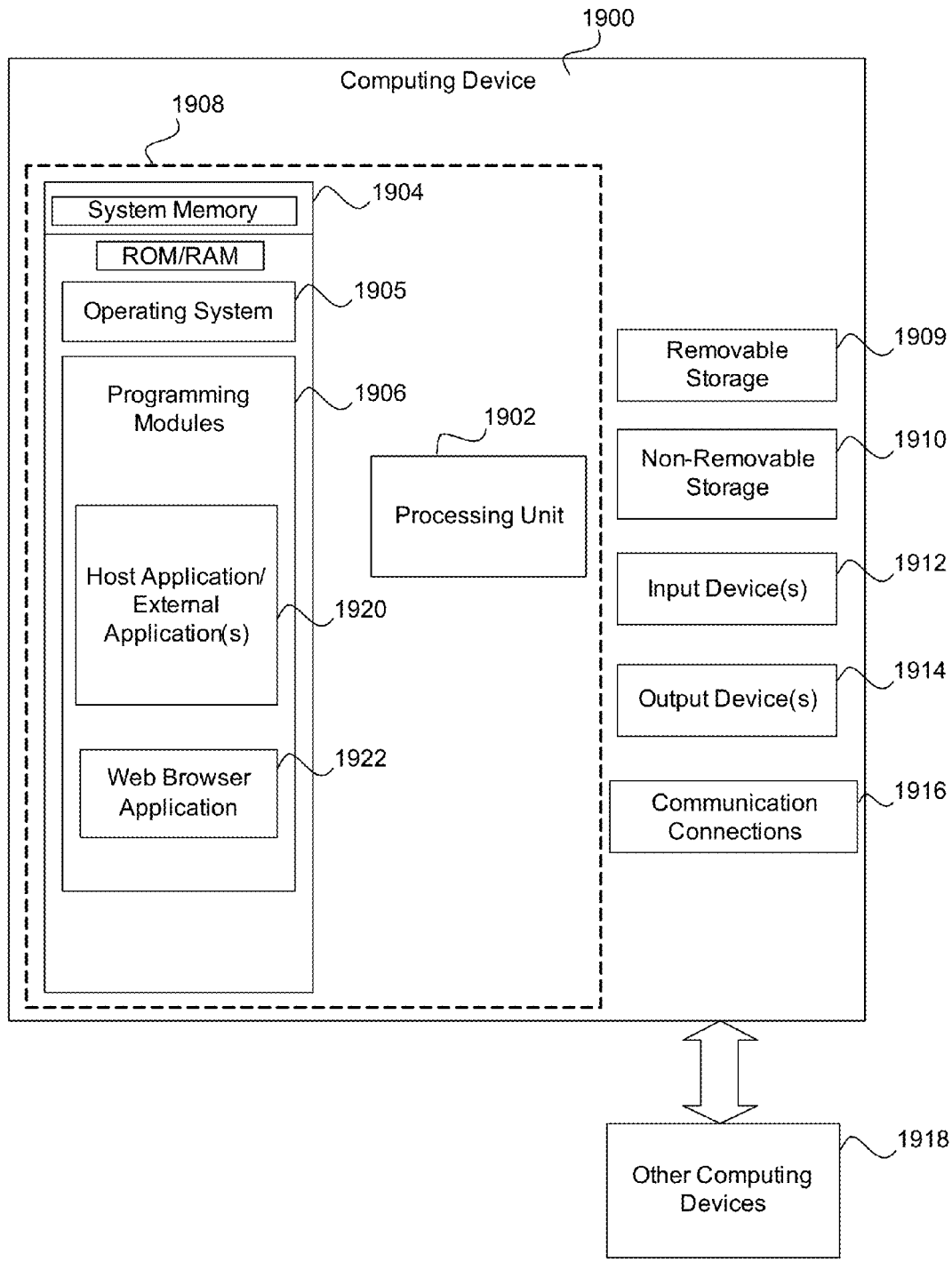
FIG. 19 is a simplified block diagram of a computing device with which embodiments of the present invention may be practiced.
Figure 20A:
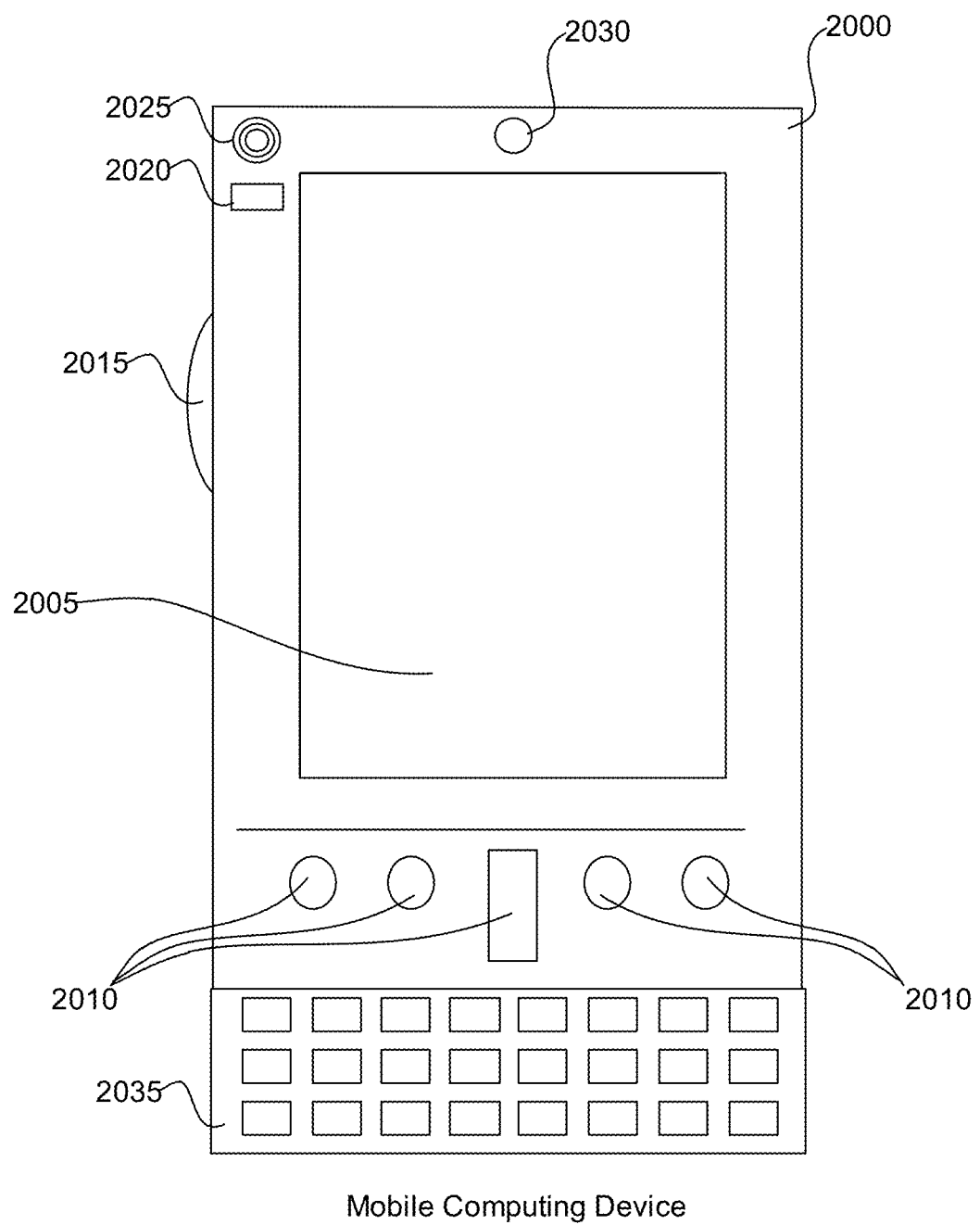
FIGS. 20A and 20B are simplified block diagrams of a mobile computing device with which embodiments of the present invention may be practiced.
Figure 20B:
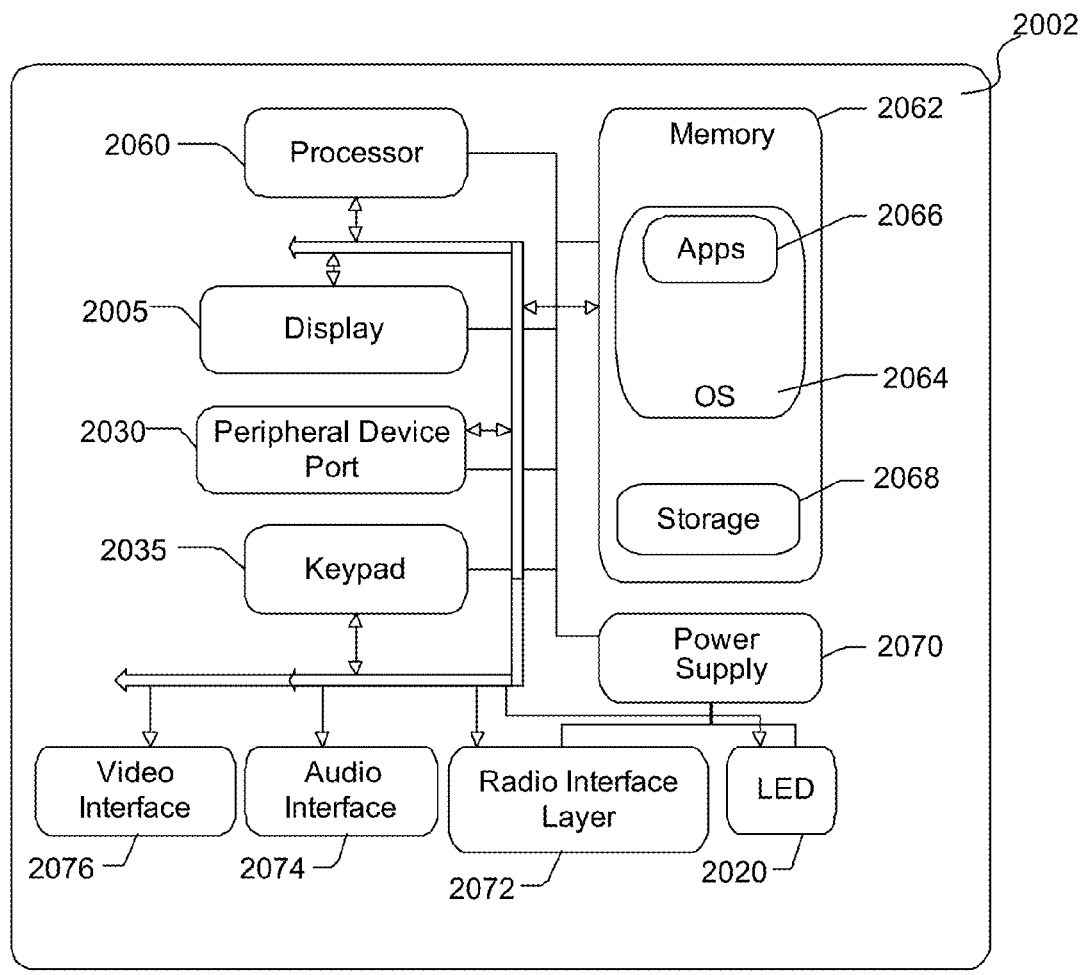
Figure 21:
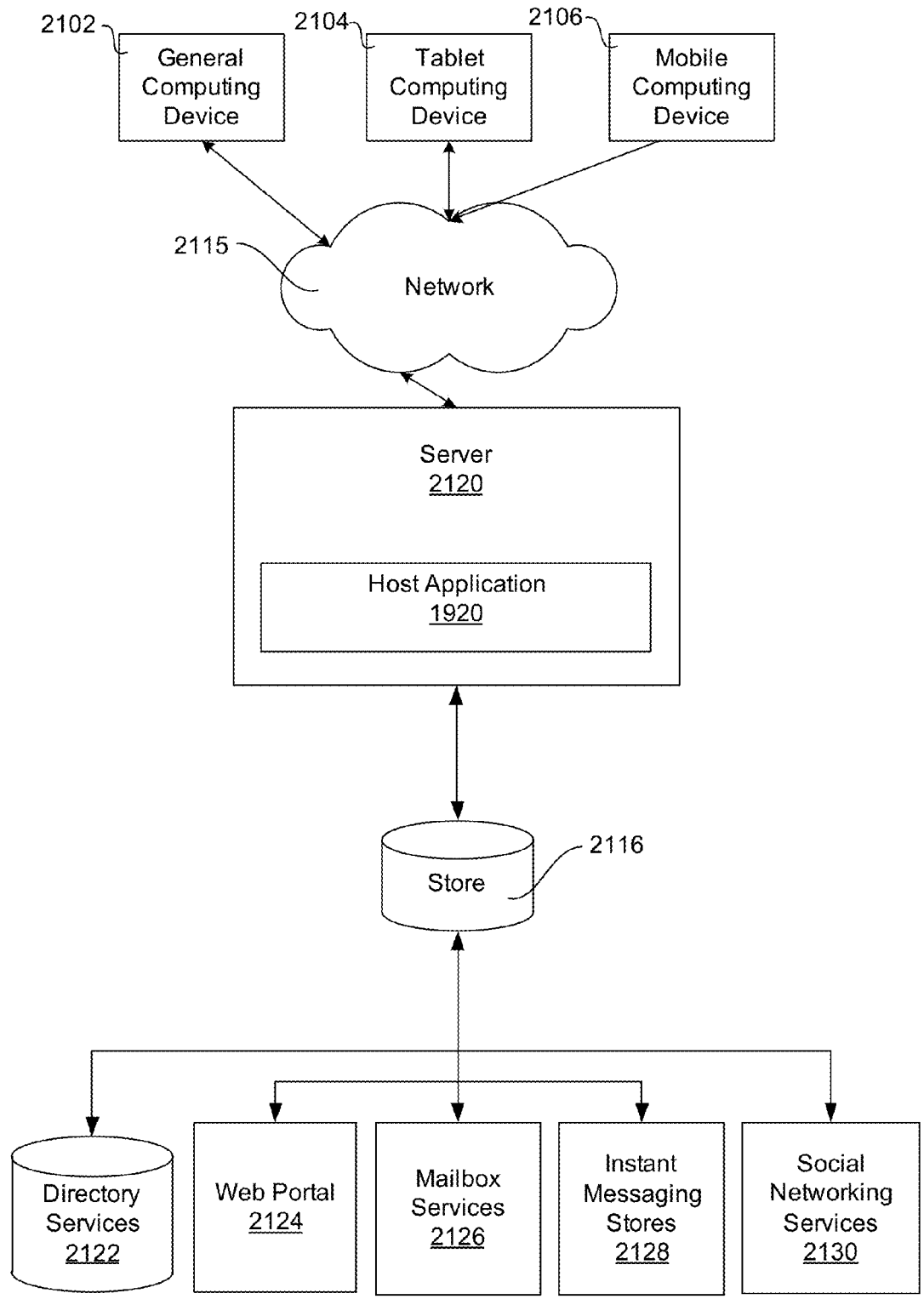
FIG. 21 is a simplified block diagram of a distributed computing system in which embodiments of the present invention may be practiced.

Referring now to FIGS. 19-21, the embodiments and functionalities described herein may operate via a multitude of computing systems such as the server 104 or client devices 102*a*-*c* described above with reference to FIG. 1, including wired and wireless computing systems, mobile computing systems (e.g., mobile telephones, tablet or slate type computers, laptop computers, etc.). In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 19 through 21 and the associated descriptions provide a discussion of a variety of operating environments in which embodiments of the invention may be practiced. However, the devices and systems illustrated and discussed with respect to FIGS. 19 through 21 are for purposes of example and illustration and are not limiting of a vast number of computing device configurations that may be utilized for practicing embodiments of the invention, described herein.

FIG. 19 is a block diagram illustrating example physical components of a computing device 1900 with which embodiments of the invention may be practiced. The computing device components described below may be suitable for the computing devices described above, for example, the server 104, and the client computing device 102. In a basic configuration, computing device 1900 may include at least one processing unit 1902 and a system memory 1904. Depending on the configuration and type of computing device, system memory 1904 may comprise, but is not limited to, volatile (e.g. random access memory (RAM)), non-volatile (e.g. read-only memory (ROM)), flash memory, or any combination. System memory 1904 may include operating system 1905 and one or more programming modules 1906, which are suitable for running applications such as external application(s) 1920 and a web browser 1922 or server applications. Operating system 1905, for example, may be suitable for controlling the operation of computing device 1900. Furthermore, embodiments of the invention may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910.

As stated above, a number of program modules and data files may be stored in system memory 1904, including operating system 1905. In addition, other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 19 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality of server applications or client applications may be implemented via application-specific logic integrated with other components of the computing device 1900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, etc. Output device(s) 1914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computing device 1900 may include communication connections 1916 allowing communications with other computing devices 1918. Examples of suitable communication connections 1916 include, but are not limited to, RF transmitter, receiver, and/or transceiver circuitry; universal serial bus (USB), parallel, or serial ports, and other connections appropriate for use with the applicable computer readable media.

FIGS. 20A and 20B illustrate a suitable mobile computing environment, for example, a mobile telephone 2000, a smart phone, a tablet personal computer, a laptop computer, and the like, with which embodiments of the invention may be practiced. With reference to FIG. 20A, an example mobile computing device 2000 for implementing the embodiments is illustrated. In a basic configuration, mobile computing device 2000 is a handheld computer having both input elements and output elements. Input elements may include touch screen display 2005 and input buttons 2010 that allow the user to enter information into mobile computing device 2000. Mobile computing device 2000 may also incorporate an optional side input element 2015 allowing further user input. Optional side input element 2015 may be a rotary switch, a button, or any other type of manual input element. In alternative embodiments, mobile computing device 2000 may incorporate more or less input elements. For example, display 2005 may not be a touch screen in some embodiments. In yet another alternative embodiment, the mobile computing device is a portable phone system, such as a cellular phone having display 2005 and input buttons 2010. Mobile computing device 2000 may also include an optional keypad 2035. Optional keypad 2035 may be a physical keypad or a "soft" keypad generated on the touch screen display.

Mobile computing device 2000 incorporates output elements, such as display 2005, which can display a graphical user interface (GUI). Other output elements include speaker 2025 and LED light 2020. Additionally, mobile computing device 2000 may incorporate a vibration module (not shown), which causes mobile computing device 2000 to vibrate to notify the user of an event. In yet another embodiment, mobile computing device 2000 may incorporate a headphone jack (not shown) for providing another means of providing output signals.

Although described herein in combination with mobile computing device 2000, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 20B is a block diagram illustrating components of a mobile computing device used in one embodiment, such as the computing device shown in FIG. 20A. That is, mobile computing device 2000 can incorporate system 2002 to implement some embodiments. For example, system 2002 can be used in implementing a "smart phone" that can run one or more applications similar to those of a desktop or notebook computer such as, for example, browser, e-mail, scheduling, instant messaging, and media player applications. In some embodiments, system 2002 is integrated as a computing device, such as an integrated personal digital assistant (PDA) and wireless phone.

One or more application programs 2066 may be loaded into memory 2062 and run on or in association with operating system 2064. Examples of application programs include phone dialer programs, e-mail programs, personal information management (PIM) programs, word processing programs, spreadsheet programs, Internet browser programs, messaging programs, and so forth. System 2002 also includes non-volatile storage 2068 within memory 2062. Non-volatile storage 2068 may be used to store persistent information that should not be lost if system 2002 is powered down. Applications 2066 may use and store information in non-volatile storage 2068, such as e-mail or other messages used by an e-mail application, and the like. A synchronization application (not shown) also resides on system 2002 and is programmed to interact with a corresponding synchronization application resident on a host computer to keep the information stored in non-volatile storage 2068 synchronized with corresponding information stored at the host computer. As should be appreciated, other applications may be loaded into memory 2062 and run on the device 2000, including the various client and server applications described herein.

System 2002 has a power supply 2070, which may be implemented as one or more batteries. Power supply 2070 might further include an external power source, such as an AC adapter or a powered docking cradle that supplements or recharges the batteries.

System 2002 may also include a radio 2072 that performs the function of transmitting and receiving radio frequency communications. Radio 2072 facilitates wireless connectivity between system 2002 and the "outside world", via a communications carrier or service provider. Transmissions to and from radio 2072 are conducted under control of the operating system 2064. In other words, communications received by radio 2072 may be disseminated to application programs 2066 via operating system 2064, and vice versa.

Radio 2072 allows system 2002 to communicate with other computing devices, such as over a network. Radio 2072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 2002 is shown with two types of notification output devices; light emitting diode (LED) 2020 that can be used to provide visual notifications and an audio interface 2074 that can be used with speaker 2025 to provide audio notifications. These devices may be directly coupled to power supply 2070 so that when activated, they remain on for a duration dictated by the notification mechanism even though processor 2060 and other components might shut down for conserving battery power. LED 2020 may be programmed to remain on indefinitely until the user takes action to indicate the powered-on status of the device. Audio interface 2074 is used to provide audible signals to and receive audible signals from the user. For example, in addition to being coupled to speaker 2025, audio interface 2074 may also be coupled to a microphone to receive audible input, such as to facilitate a telephone conversation. In accordance with embodiments of the present invention, the microphone may also serve as an audio sensor to facilitate control of notifications, as will be described below. System 2002 may further include video interface 2076 that enables an operation of on-board camera 2030 to record still images, video stream, and the like.

A mobile computing device implementing system 2002 may have additional features or functionality. For example, the device may also include additional data storage devices (removable and/or non-removable) such as, magnetic disks, optical disks, or tape. Such additional storage is illustrated in FIG. 20B by storage 2068. Computer storage media may include volatile and nonvolatile, removable and non-removable media implemented in any method or technology for storage of information, such as computer readable instructions, data structures, program modules, or other data.

Data/information generated or captured by the device 2000 and stored via the system 2002 may be stored locally on the device 2000, as described above, or the data may be stored on any number of storage media that may be accessed by the device via the radio 2072 or via a wired connection between the device 2000 and a separate computing device associated with the device 2000, for example, a server computer in a distributed computing network, such as the Internet. As should be appreciated such data/information may be accessed via the device 2000 via the radio 2072 or via a distributed computing network. Similarly, such data/information may be readily transferred between computing devices for storage and use according to well-known data/information transfer and storage means, including electronic mail and collaborative data/information sharing systems.

FIG. 21 illustrates a system architecture for providing the host application 1920 to one or more client devices, as described above. Content developed, interacted with or edited in association with the host application 1920 may be stored in different communication channels or other storage types. For example, various documents may be stored using directory services 2122, web portals 2124, mailbox services 2126, instant messaging stores 2128 and social networking sites 2130. The host application 1920 may use any of these types of systems or the like for enabling data utilization, as described herein. A server 2120 may provide the host application 1920 to clients. As one example, server 2120 may be a web server providing the host application 1920, over the web. Server 2120 may provide the host application 1920 over the web to clients through a network 2115. Examples of clients that may access the host application 1920 include computing device 1900, which may include any general purpose personal computer 2102, a tablet computing device 2104 and/or mobile computing device 2106 such as smart phones. Any of these devices may obtain content from the store 2116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A computer-implemented method comprising:
receiving a shape on a drawing canvas of a drawing application and creating an electronic drawing that includes the shape;
displaying, on the drawing canvas of a drawing application, a notification feature associated with the shape, wherein the notification feature is depicted at a location of the shape on the drawing canvas of a drawing application, the notification feature including a coauthor notification icon and a comment notification icon, the coauthor notification icon providing a notification indicating recent changes to the shape or the drawing canvas by a coauthor, the comment notification icon providing a notification indicating the existence of a comment associated with the shape or the drawing canvas;
in response to receiving the coauthor notification icon, displaying relative to the drawing canvas of a drawing application a coauthoring dialog to display changes that recently occurred in the drawing canvas of a drawing application;
in response to receiving the comment notification icon, displaying relative to the drawing canvas of a drawing application a commenting dialog comprising a comment associated with the shape, the comment including a name of a commenting user;
displaying a viewer version of the electronic drawing that includes the shape while simultaneously displaying the comment notification icon in the viewer version of the electronic drawing;
receiving within the viewer version of the electronic drawing an entry of a new comment associated with the displayed shape and associating the new comment with the comment notification icon, wherein the viewer version of the electronic drawing prevents edits to the content of the electronic drawing; and
in response to receiving the new comment, displaying on the drawing canvas of the drawing application the shape, the coauthor notification icon and the comment notification icon comprising the comment and the new comment, both the comment and the new comment including the name of the user.

2. The computer-implemented method of claim 1, wherein the shape is placed on the drawing canvas by a first user.

3. The computer-implemented method of claim 2, wherein the comment associated with the shape is received from a second user, and wherein the commenting user is the second user.

4. The computer-implemented method of claim 3, further comprising receiving a second comment from a third user, the comment associated with the shape and including a name of the third user, wherein the second comment is appended to the comment from the second user.

5. The computer-implemented method of claim 3, further comprising, upon deletion of the shape, deleting the comment from the second user.

6. The computer-implemented method of claim 1, wherein the comment is displayed at least partially over the drawing canvas.

7. The computer-implemented method of claim 1, wherein the drawing canvas is displayed within a drawing tool.

8. The computer-implemented method of claim 1, wherein the drawing canvas is displayed within a browser window.

9. The computer-implemented method of claim 1, wherein the shape includes a plurality of subshapes.

10. The computer-implemented method of claim 1, wherein the comment notification icon is displayed after receiving the comment associated with the shape.

11. A computer-implemented method of managing comments in a drawing document, the method comprising:
receiving a shape on a drawing canvas of a drawing application and creating an electronic drawing that includes the shape;
receiving a first comment, associated with the shape, the first comment received via an interface associated with the drawing canvas of a drawing application;
in response to receiving the first comment, displaying a first notification feature including a first comment notification icon alongside the shape, wherein the first notification feature is depicted at a location of the shape on the drawing canvas of a drawing application, the first comment notification icon indicating the existence of a comment associated with the shape;
receiving a second comment, the second comment associated with the drawing canvas of a drawing application, the second comment received via the interface associated with the drawing canvas of a drawing application;

in response to receiving the second comment, displaying a second notification feature including a second comment notification icon operable to indicate the existence of a comment associated with the drawing canvas of a drawing application;

in response to receiving a selection of the first comment notification icon from the drawing canvas of a drawing application, displaying a first commenting dialog at the first notification feature, the first commenting dialog comprising the first comment including names of commenting users;

in response to receiving a selection of the second comment notification icon from the drawing canvas of a drawing application, displaying a second commenting dialog at the second notification feature, the second commenting dialog comprising the second comment including names of commenting users;

displaying a viewer version of the electronic drawing that includes the shape while simultaneously displaying the first and second comment in the viewer version of the electronic drawing;

in response to selection of the first or second comment notification icon in the viewer version of the electronic drawing, receiving within the viewer version of the electronic drawing an entry of a new comment associated with the displayed shape, and associating the new comment with the first comment notification icon or the second comment notification icon, wherein the viewer application prevents edits to the content of the electronic drawing; and displaying on the drawing canvas of a drawing application, the shape and the first and second notification icons and, in response to receiving a selection of either of the first or second displayed notification icons, displaying the respective first or second commenting dialogs with the first and second comments, respectively, along with the respective new comment.

12. The computer implemented method of claim 11, further comprising receiving a reply comment, the reply comment being associated with the shape and the comment associated with the shape.

13. The computer-implemented method of claim 11, further comprising:
receiving an indication of movement of the shape on the drawing canvas from a first position to a second position; and
in response to the indication of the movement of the shape, automatically moving the first comment notification icon closer to the second position of the shape.

14. The computer-implemented method of claim 11, wherein the first comment is received from a first user, and the second comment is received from a second user.

15. The computer-implemented method of claim 14, wherein displaying the first and second comment notification icons occur on a first computing system operated by the first user, and wherein the second comment is received from a second computing system remote from the first computing system.

16. The computer-implemented method of claim 11, further comprising:
receiving a change to the shape;
in response to receiving the change to the shape, displaying the first notification feature further including a coauthor notification icon providing a notification indicating the existence of the change to the shape; and
in response to receiving a selection of the coauthor notification icon included by the first notification feature, displaying a coauthoring dialog to display the change to the shape.

17. The computer-implemented method of claim 11, further comprising:
receiving a change to the drawing canvas;
in response to receiving the change to the drawing canvas, displaying the second notification feature further including a coauthor notification icon providing a notification indicating the existence of the change to the drawing canvas; and
in response to receiving a selection of the coauthor notification icon included by the second notification feature, displaying a coauthoring dialog to display the change that recently occurred to the drawing canvas.

18. The computer-implemented method of claim 17, wherein the change that recently occurred to the drawing canvas is a change made after a most recent save of the drawing canvas.

19. A system for facilitating collaboration in a drawing tool, the system comprising:
a processor; and
a memory including computer-readable instructions which when executed by the processor are operable to:
receive a change associated with a shape on a drawing canvas of a drawing application of the drawing tool, wherein the shape is an element of an electronic drawing;
display in the drawing application a notification feature associated with the shape, wherein the notification feature is depicted at a location of the shape on the drawing canvas of the drawing application, the notification feature including a coauthor notification icon, wherein the coauthor notification icon is operable to provide a notification indicating recent changes to the shape;
in response to receiving a selection of the coauthor notification icon, display a coauthoring dialog user interface to display changes that recently occurred
display a comment notification icon included in the notification feature, the comment notification icon providing a notification indicating the existence of a comment associated with the shape, wherein the comment associated with the shape comprises a first comment entered via a selectable comment notification icon in a viewer version of the electronic drawing that prevents edits to the content of the electronic drawing; and
in response to receiving a selection of the comment notification icon, display relative to the drawing canvas of the drawing application a commenting dialog comprising the first comment, the first comment including a name of a commenting user.

20. The system of claim 19, wherein changes that recently occurred in the drawing canvas are changes made after a most recent save of the drawing canvas.

21. The computer-implemented method of claim 1, wherein the comment and the new comment are displayed chronologically.

22. The computer-implemented method of claim 1, wherein the comment and the new comment are entered concurrently.

23. The computer-implemented method of claim 1, further comprising, in response to selection of the comment notification icon from the drawing canvas of the viewer application, displaying the commenting dialog and enabling editing of the commenting dialog.

\* \* \* \* \*